United States Patent [19]

Oie et al.

[11] Patent Number: 5,130,813
[45] Date of Patent: Jul. 14, 1992

[54] IMAGE DATA SUPERVISING SYSTEM

[75] Inventors: Masahiro Oie; Harumi Nakano; Akihiro Tsukamoto, all of Tokyo, Japan

[73] Assignee: Casio Computer Co., Ltd., Tokyo, Japan

[21] Appl. No.: 399,828

[22] Filed: Aug. 28, 1989

[30] Foreign Application Priority Data

Aug. 31, 1988 [JP] Japan .................. 63-114101[U]
Dec. 26, 1988 [JP] Japan .................. 63-328185

[51] Int. Cl.⁵ ............................................. H04N 5/781
[52] U.S. Cl. .................................... 358/335; 358/906; 358/909; 360/33.1
[58] Field of Search ............... 358/335, 906, 342, 341, 358/909; 360/33.1, 35.1, 14.2, 14.3

[56] References Cited

U.S. PATENT DOCUMENTS

| 4,366,501 | 12/1982 | Tsunekawa et al. | 358/310 |
| 4,599,657 | 7/1986 | Kinoshita et al. | 358/335 |
| 4,647,976 | 3/1987 | Nakagaki et al. | 358/213 |
| 4,691,253 | 9/1987 | Silver | 360/33.1 |
| 4,774,596 | 9/1988 | Hashimoto | 358/342 |
| 4,783,707 | 11/1988 | Nemoto et al. | 360/105 |
| 4,887,161 | 12/1989 | Watanabe et al. | 358/906 |
| 4,888,648 | 12/1989 | Takeuchi et al. | 358/335 |
| 4,901,160 | 2/1990 | Kinoshita et al. | 358/906 |
| 4,956,725 | 9/1990 | Kozuki et al. | 358/335 |
| 4,982,291 | 1/1991 | Kurahashi et al. | 358/906 |

FOREIGN PATENT DOCUMENTS 0186883 7/1986 European Pat. Off. ............ 358/906

Primary Examiner—Roy N. Envall, Jr.
Assistant Examiner—Huy Nguyen
Attorney, Agent, or Firm—Frishauf, Holtz, Goodman & Woodward

[57] ABSTRACT

An image data supervising system includes an imaging device, a reproducing device and a data supervising unit for processing, for instance, an electronic still image. In the image data supervising system, the still images are recorded on a recording medium such as a video floppy disk, and the data relating to the still images recorded on the recording medium are written into an memory unit. The data which have been written in the memory unit can be confirmed at any desirable time by way of the data supervising unit. While the image data which have been recorded on the recording medium are reproduced by the reproducing device, any desirable data can be superimposed on this reproduced image data.

15 Claims, 18 Drawing Sheets

IMAGE DATA SUPERVISING SYSTEM

BACKGROUND OF THE INVENTION

1. Field of the Invention

The present invention relates to an image data supervising system used in an image data processing apparatus in which image data derived from an electronic still camera, a video camera and the like are converted into magnetic signals or electric signals, and thereafter recorded on a recording medium for storage.

2. Description of the Related Art

Very recently, electronic still cameras, video cameras and the like have been proposed so as to acquire image data. These appliances employ either magnetic recording mediums such as video floppy disks and video tapes, or electronic recording mediums such as semiconductor memories.

In the electronic still cameras, video cameras, and the like for converting the image data into the corresponding magnetic signals or corresponding electric signals to be recorded on the recording mediums, no definite confirmation can be made as to what image data have been recorded on the recording mediums unless these image data are reproduced on a television monitor, or the like.

Under such a circumstance, the more the quantity of the recorded recording mediums increases, the more the recording medium supervision becomes complex. Thus, cumbersome operations are necessarily required. In specific cases, a large quantity of searching time is needed in order to search a desirable image from the recording medium.

On the other hand, a strong demand is made such that a certain message or the like is additionally applied to the image data which have been produced by operating the electronic still cameras, video cameras, and the like.

To this end, in the conventional floppy disk type electronic still cameras, a queue track for recording the supervising data is additionally provided on the entire recording area of the floppy disk in addition to the image recording track region thereof.

Since, however, the recording capacity of the above-described queue track is rather small as compared with that of the recording track region, any messages for a plurality of image data which have been recorded on the recording track region cannot be recorded on the queue track.

In, on the other hand, the conventional video cameras, the superimposing function capable of superimposing such messages on the recorded image information is specifically provided on some types of video cameras.

However, such video cameras equipped with the superimposing function have the following drawbacks. That is, as the image data are recorded on the recording medium under the condition that the messages have been superimposed, no new message can be inserted into these image data once the photographing operation by the video camera is completed. In addition, the messages which have been superimposed during the photographing operation cannot be deleted, or changed into other messages.

SUMMARY OF THE INVENTION

The present invention has been made in an attempt to solve the above-described problems of the conventional image data processing apparatus, and therefore, an object of the invention is to provide an image data supervising apparatus in an image data processing apparatus capable of readily supervising image data which have been recorded by electronic still cameras, video cameras, and the like, or a recording medium on which these image data have been recorded.

To achieve the above-described object of the invention, an image data recording apparatus comprises:

a housing;

image signal producing means provided in said housing, for producing an electric image signal from an optical image of an object to be imaged;

recording means provided in said housing, for recording the electric image signal produced by said image signal producing means on a recording medium detachably stored in said housing;

a case detachably stored in said housing;

data input means provided in one of said housing and said case, for inputting at least information data and identification data for identifying said recording medium;

memory means provided in said case, for storing at least said information data and said identification data input from said data input means; and, memory control means provided in one of said housing and said case, for controlling a read/write operation of said memory means, and for processing said information data and said identification data, as a single piece of data having a relationship between said information data and identification data.

With the above-described arrangement, there are particular advantages of the present invention that either the image data which have been recorded by electronic still cameras, video cameras, or the like, or the contents of the recording mediums on which these image data have been recorded can be readily confirmed without reproducing these data on the television monitor, or the like.

Furthermore, the messages for the image data which have been recorded by electronic still cameras, video cameras, or the like can be recorded and stored, and also the messages once inputted in the image data can be easily and simply deleted, or changed by other messages, according to the image data supervising apparatus of the present invention.

DETAILED DESCRIPTION OF THE PREFERRED EMBODIMENTS

Construction Of First Electronic Still Camera System

Referring now to FIGS. 1 to 8, a construction of an electronic still camera system according to a first preferred embodiment of the present invention will be described.

Figure 1:
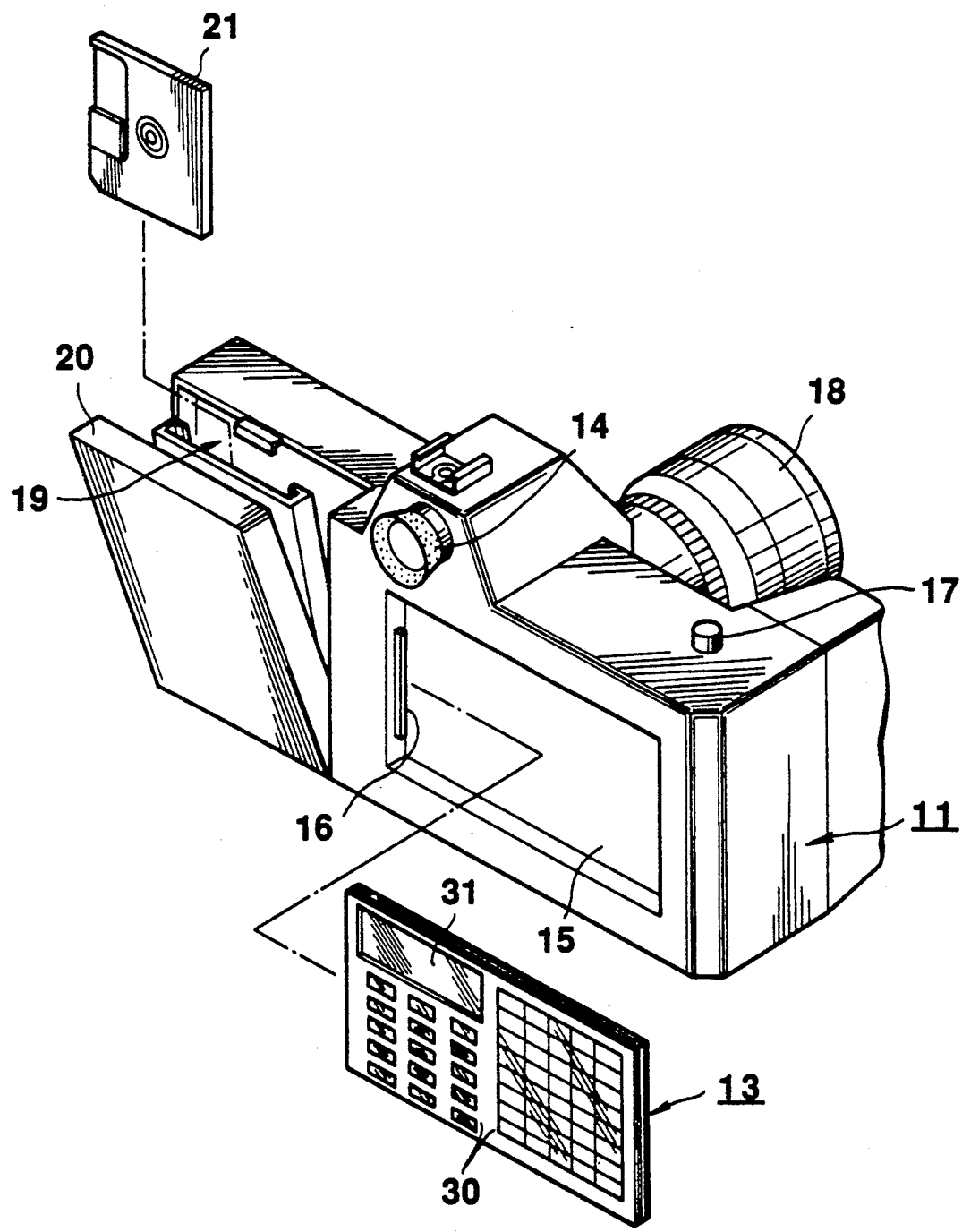
FIG. 1 is a perspective view of a photographic apparatus and a data supervising unit for an electronic still camera according to a first preferred embodiment of the invention.
Figure 2:
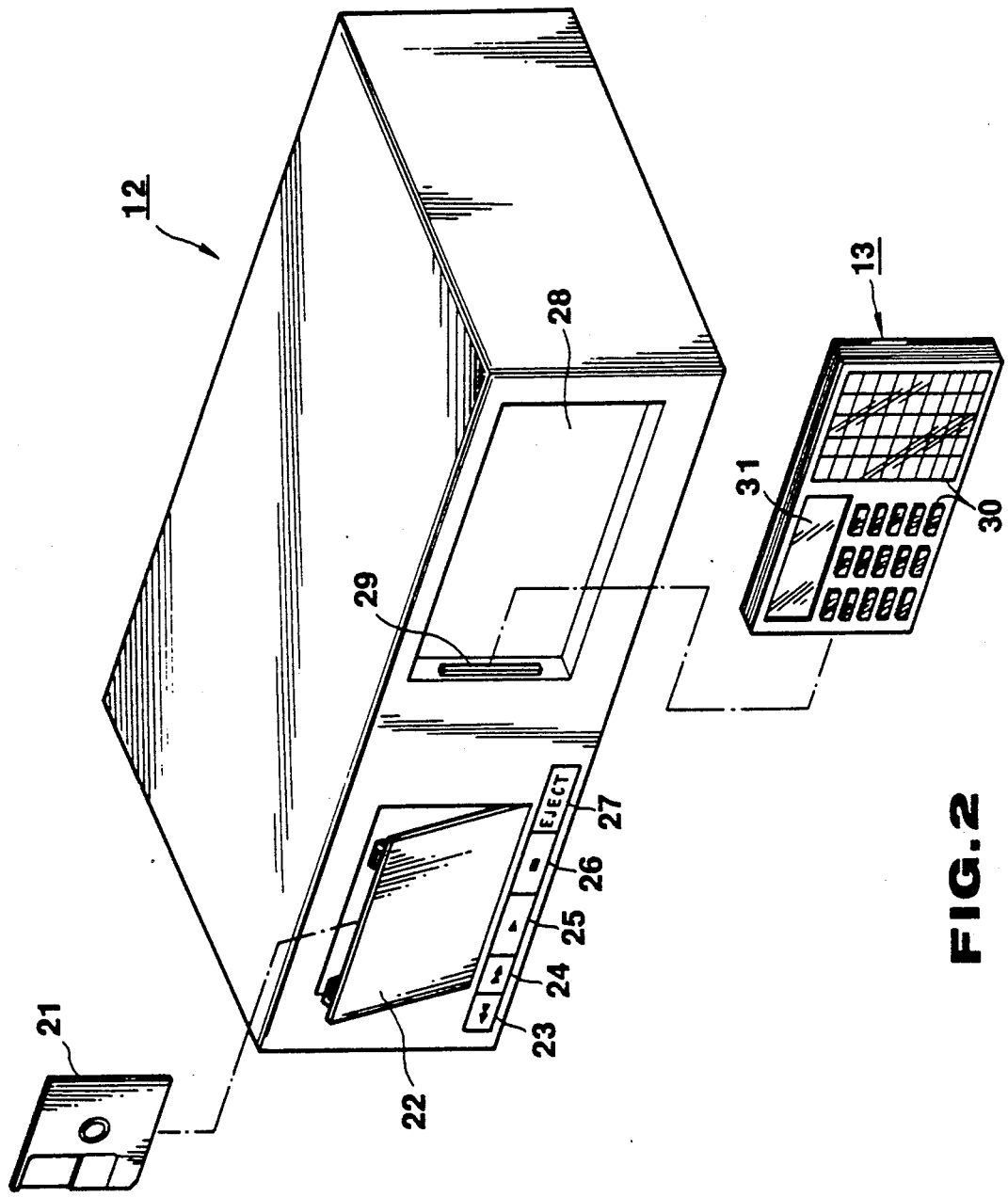
FIG. 2 is a perspective view of a reproducing apparatus and a data supervising unit for the electronic still camera system according to the first preferred embodiment of the invention.
Figure 3:
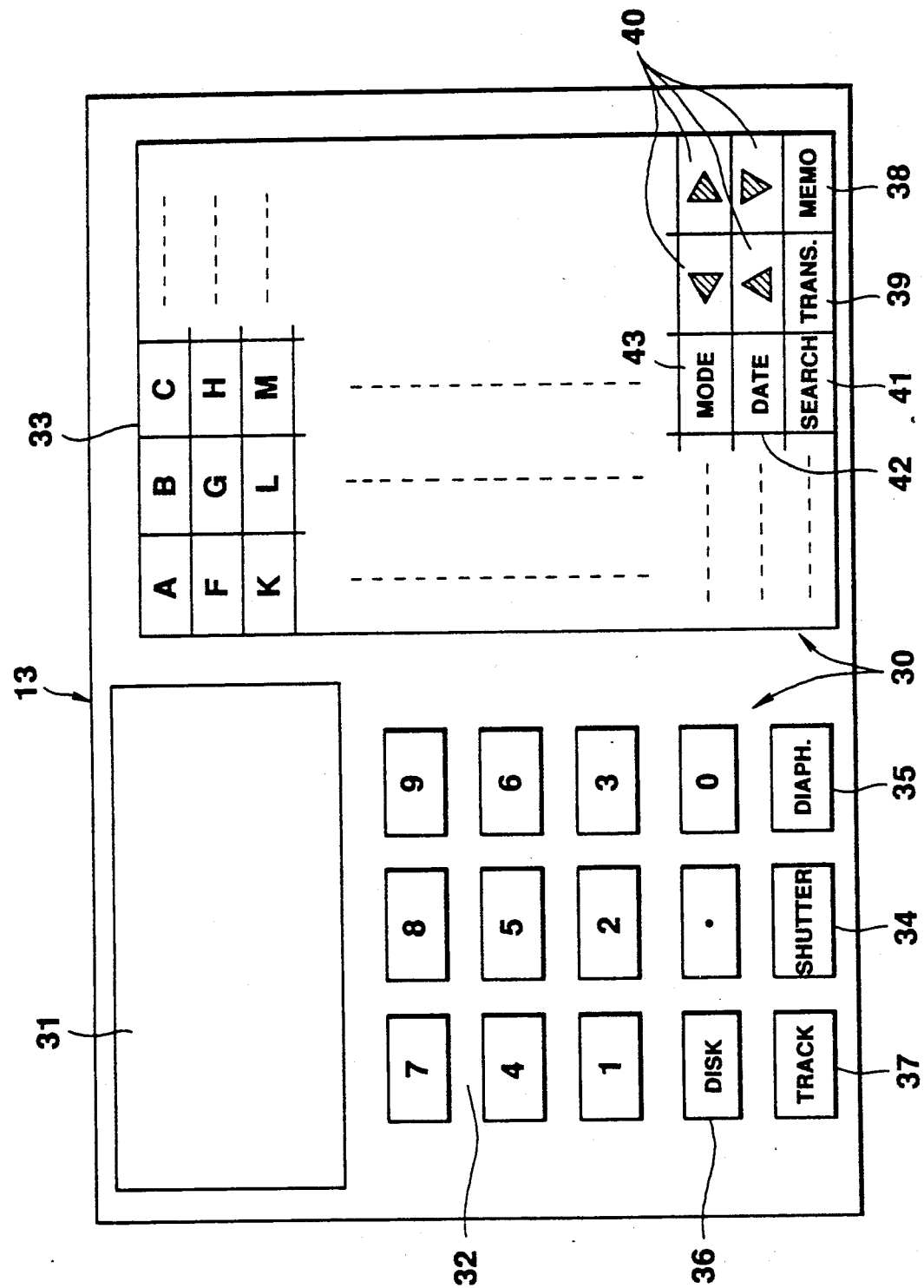
FIG. 3 is a perspective view of the data supervising unit for the electronic still camera according to the first preferred embodiment of the invention.

First, FIGS. 1 through 3 represent a photographing apparatus or machine 11, a reproducing machine 12 and a data supervising unit 13 which comprise the electronic still camera system.

A construction of the photographing machine 11 shown in FIG. 1 will be first of all explained. A finder 14 and a supervising unit mounting section 15 are provided on a rear surface of the photographing machine 11. The supervising unit mounting section 15 is so constructed that the above-described data supervising unit 13 is detachably mounted thereon, and includes a connector 16 for electrically connecting an electronic circuit (will be discussed later) provided within the photographing machine 11 and the data supervising unit 13 when the data supervising unit 13 is mounted thereon.

A release switch 17 is provided on an upper surface of the photographing machine 11 and a lens 18 is mounted on a front surface thereof.

A magnetic recording apparatus 19 is provided within a left side section of the photographing machine 11. A rear surface of the left side section of the photographing machine 11 is formed as a pivotal cover 20 which is pivotally journalled with respect to a bottom surface section. When this pivotal cover 20 is rotated toward the rear side surface, a video floppy disk 21 can be inserted into the photographing machine 11 and also ejected therefrom.

In the reproducing machine 12 shown in FIG. 2, there are formed an FD (floppy disk) inserting section 22 at the front surface thereof, into which the floppy disk 21 on which the still image data has been recorded by the photographing machine 11 is inserted. Under the FD inserting section 22, there are provided operation keys for controlling various operations of a floppy disk reproducing device (not shown in detail), such as a rewind key 23, a fast forward key 24, a reproduction key 25, a stop key 26 and an eject key 27. At a right side of the FD inserting unit 22, a supervising unit mounting unit 28 on which the above-described data supervising unit 13 can be detachably mounted is formed. This supervising unit mounting unit 28 has the same construction as the above-described photographing machine 11 and includes a connector 29. When the data supervising unit 13 is mounted, an electronic circuit (will be discussed later) provided within the reproducing machine 12 is electrically connected to the data supervising unit 13 by this connector 29.

In the data supervising unit 13 as illustrated in FIG. 3, there are provided a key input unit 30 and a display unit 31 capable of displaying either data or time entered by this key input unit 30. On this key input unit 30, there are provided a numeral key 32, a character input key 33 and various function keys 34 to 43. As the function keys 34 to 43, there are employed a shutter key 34 for setting a shutter speed and diaphragm key 35 for setting a diaphragm value of the photographing machine 11 when the data supervising unit 13 is mounted on this photographing machine 11. As further function keys, a DISK key 36 and a TRACK key 37 are operated while this data supervising unit 13 is mounted on either the photographing machine 11 or reproducing machine 12. These function keys 36 and 37 are utilized when the disk numbers and track numbers of the respective floppy disks are designated, or when the data is retrieved by utilizing the disk number and track number. A memory key 38 is used to input the message data with respect to the image data which has been recorded on the floppy disk 21, whereas a transfer key 39 is used for superimposing the above-described message data on the image to be reproduced when the data supervising unit 13 is mounted on the reproducing machine 12. In addition, a cursor key 40 is used to instruct movements of the cursor displayed on the display unit 31 when entering the data by means of the numeral key 32 and character input key 33, and also to instruct the recording track or reproducing track when the data supervising unit 13 is mounted on the photographing machine 11 or reproducing machine 12.

A DATE key 42 is utilized to input as date data the data which has been input by the numeral key 32. A mode key 43 is to set a mode of this data supervising unit 13 for switching between a single mode in which the data process and the like are performed by only the data supervising unit 13, and a cooperation mode in which the data process and the like are executed by the photographing machine 11 in conjunction with the reproducing machine 12.

In the electronic still camera system comprising the above-described photographing machine 11, reproducing machine 12, and data supervising unit 13, the still image data is recorded while the data supervising unit 13 is mounted on the photographing machine 11, and also reproduced while the data supervising unit 13 is mounted on the reproducing machine 12.

The functions of the data supervising unit 13 are to control the shutter speed, the diaphragm, the recording track of the floppy disk and the like with respect to the photographing machine 11 when mounted on this photographing machine 11, and also to supervise the recording of the disk number, track number, and message data input by the various keys for every recorded still image data. Furthermore, when the data supervising unit 13 is mounted to reproducing machine 12, this unit 13 controls the reproducing track, or the like of this reproducing machine 12, to identify the floppy disk which has been inserted into the reproducing machine 12, and to transfer the message data which should be superimposed to the image to be reproduced.

Arrangements Of Photographing/Reproducing Machines And Data Supervising Unit The internal circuit arrangements of the above-described photographing machine 11 and reproducing 12, and also the data supervising unit 13 will now be described.

Figure 4:
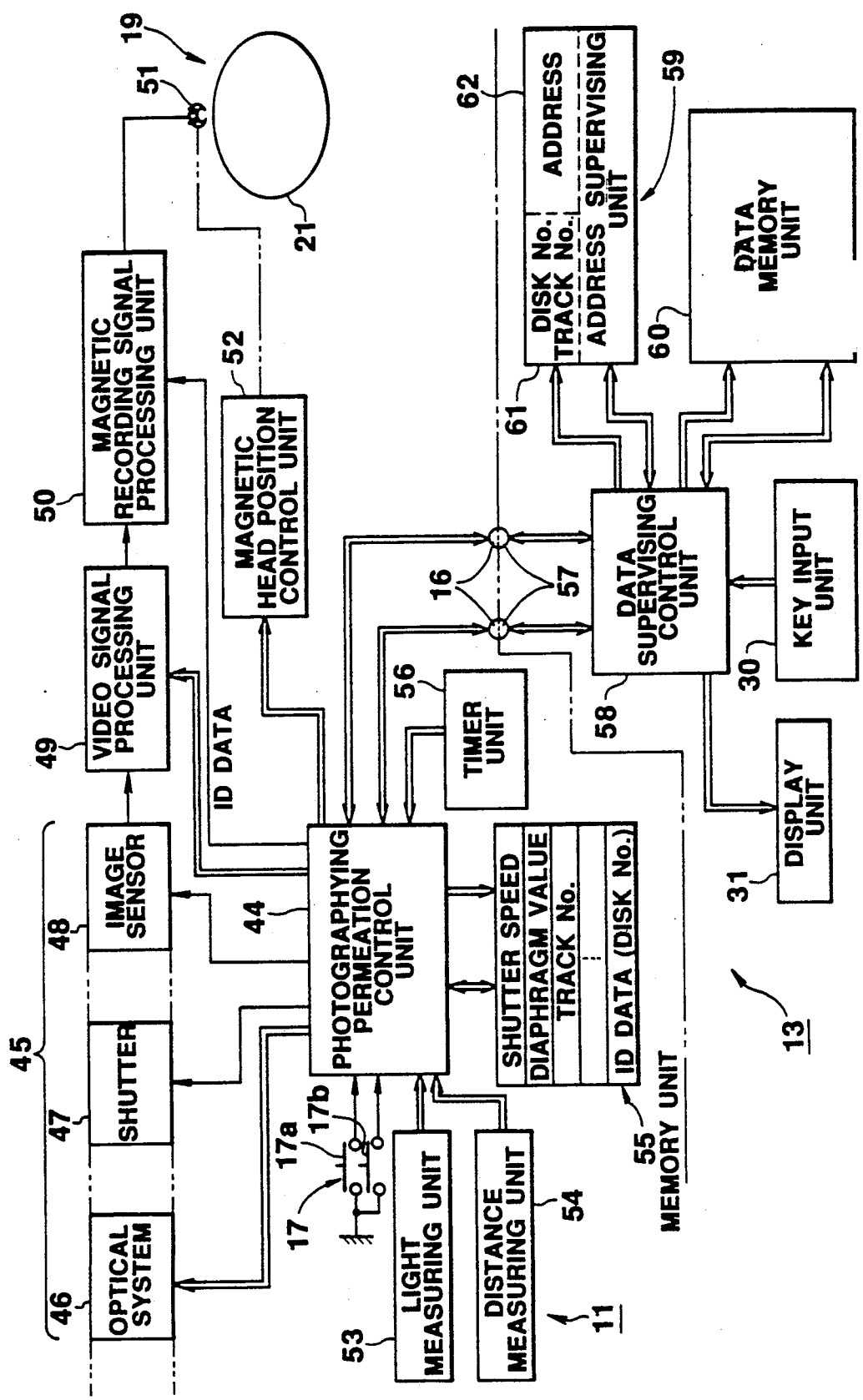
FIG. 4 is a schematic block diagram of internal arrangements of the data supervising unit shown in FIG. 3 and also of the photographing apparatus shown in FIG. 1.

In FIG. 4, there are shown internal arrangements of the photographing machine 11 and data supervising unit 13.

In the photographing machine 11, a photographing operation control unit 44 is provided so as to control overall operations of the photographing machine 11.

A photographing unit 45 controlled by the photographing operation control unit 44 is provided in the photographing machine 11. The photographing unit 45 comprises an optical system 46 having a lens, a diaphragm and the like, a shutter 47, and an image sensor 48 which comprises a solid-state imaging system such as a CCD (charge-coupled device). In the optical system 46, a lense position, and a diaphragm open degree are set in response to a control signal derived from the above-described photographing operation control unit 44. The opening-time period of the shutter 47 is under the control of the photographing operation control unit 44. The image sensor 48 is driven under the control of the photographing operation control unit 44 so as to produce an electric signal (referred to as "a video, or picture signal" hereinafter) in response to an object image which is focused thereon via the optical system 46 and shutter 48. This video signal from the image signal is output to a video signal processing unit 49.

The video signal processing unit 49 processes the video signal output from the image sensor 48 in response to the control signal derived from the control unit 44 in order to produce an (Y+S) signal containing a luminance signal and a synchronization signal, and also color difference signals (R−Y) and (B−Y). After these signals have been frequency-modulated and then synthesized with each other, the resultant synthesized signal is output to a magnetic recording signal processing unit 50 by this video signal processing unit 49.

The magnetic recording signal processing unit 50 outputs the synthesized signal derived from the video signal processing unit 49 as the magnetic recording signal to a magnetic head 51 of a magnetic recording device 51. Into the magnetic recording signal processing unit 50, an ID (identification) data such as disk number data derived from the control unit 44 is supplied, and is also output as the above-described magnetic recording signal to the magnetic head 51.

In response to the magnetic recording signal furnished from the magnetic recording signal processing unit 50, the magnetic head 51 enables both the image data and ID data to be recorded on the floppy disk 21. The relative position of this magnetic head 51 with respect to the floppy disk 21 is under control of the magnetic head position control unit 52 in order that the data are recorded on a predetermined track of the floppy disk 21.

It should be noted that the magnetic head position control unit 52 moves the magnetic head 51 in response to a control signal supplied from the photographing operation control unit 44.

A single recording track capacity of the floppy disk 21 is equal to 1-field image data of the NTSC (National Television System Comittee) type color television signal. The floppy disk 21 contains 50 tracks for recording the image data and 1 queue track for recording the ID data such as disk number and the like.

Also connected to the photographing operation control unit 44, are a release switch 17, a light measuring unit 53, a distance measuring unit 54, a memory unit 55 and a timer unit 56.

The release switch 17 includes a first switch 17a and a second switch 17b. The first switch 17a is turned on when the release switch 17 is operated over a half push travel and the second switch 17b is turned on when the release switch 17 is operated over a full push travel.

The light measuring unit 53 senses the brightness of the incoming light and outputs the sensing signal to the photographing operation control unit 44.

The function of the distance measuring unit 54 is to measure a distance from this distance measuring unit 54 to the object to be image (not shown in detail).

The memory unit 55 receives the data such as the shutter speeds and other data which have been key-input in the data supervising unit 13, and then input via the photographing operation control unit 44.

The control operations of the photographing unit 44 are as follows. In response to the ON signal of the first switch 17a produced when the release switch 17 is operated over a half push travel, the photographing operation control unit 44 controls the lens position of the optical system 46 based upon the data derived from the distance measuring unit 54, and also controls the diaphragm opening degree of the optical system 46 based upon either the diaphragm value data, or the data supplied from the light measuring unit 53 which has been stored in the memory unit 55.

Furthermore, the photographing operation control unit 44 drives the shutter 47 based upon either the data output from the light measuring unit 53, or the shutter speed data which have been stored in the memory unit 55 in response to the on-signal of the second switch 17b produced when the release switch 17 is operated over a full push travel.

The timer unit 56 continuously counts seconds, minutes, hours, days, months and years. The resultant date data are output via the photographing operation control unit 44 to a data supervising unit 13 in response to the on-signal produced when the release switch 17 is pushed over a full travel distance.

A connector 57 connectable to another connector 16 of the photographing machine 11 is provided on the data supervising unit 13. Thus the data supervising unit 13 is electrically connected to the photographing machine 11 by way of this connector 57. Also to this connector 57, a data supervising control unit 58 is connected.

The key input unit 30, a display unit 31, an address supervising unit 59, and a data memory unit 60 are connected to the data supervising control unit 58.

The address supervising unit 59 includes a number memory 61 for storing track numbers and disk numbers, and also an address memory unit 62 for storing a read/write address for the data memory unit 60 corresponding to the respective track number stored in this number memory 61.

A data memory unit 60 stores either the data which have been supplied from the photographing machine 11 and reproducing machine 12, or the data which have been input from the key input unit 30 in response to the control by the data supervising control unit 58.

The functions of the data supervising control unit 58 are to output either the data input from the key input unit 30, or the data stored in the data memory unit 60 to either the photographing machine 11 or reproducing machine 12, and to receive or fetch the data from the photographing machine 11 and reproducing machine 12 under the control of either the photographing machine 11 or reproducing machine 12.

Internal Arrangement Of Reproducing Machine

Figure 5:
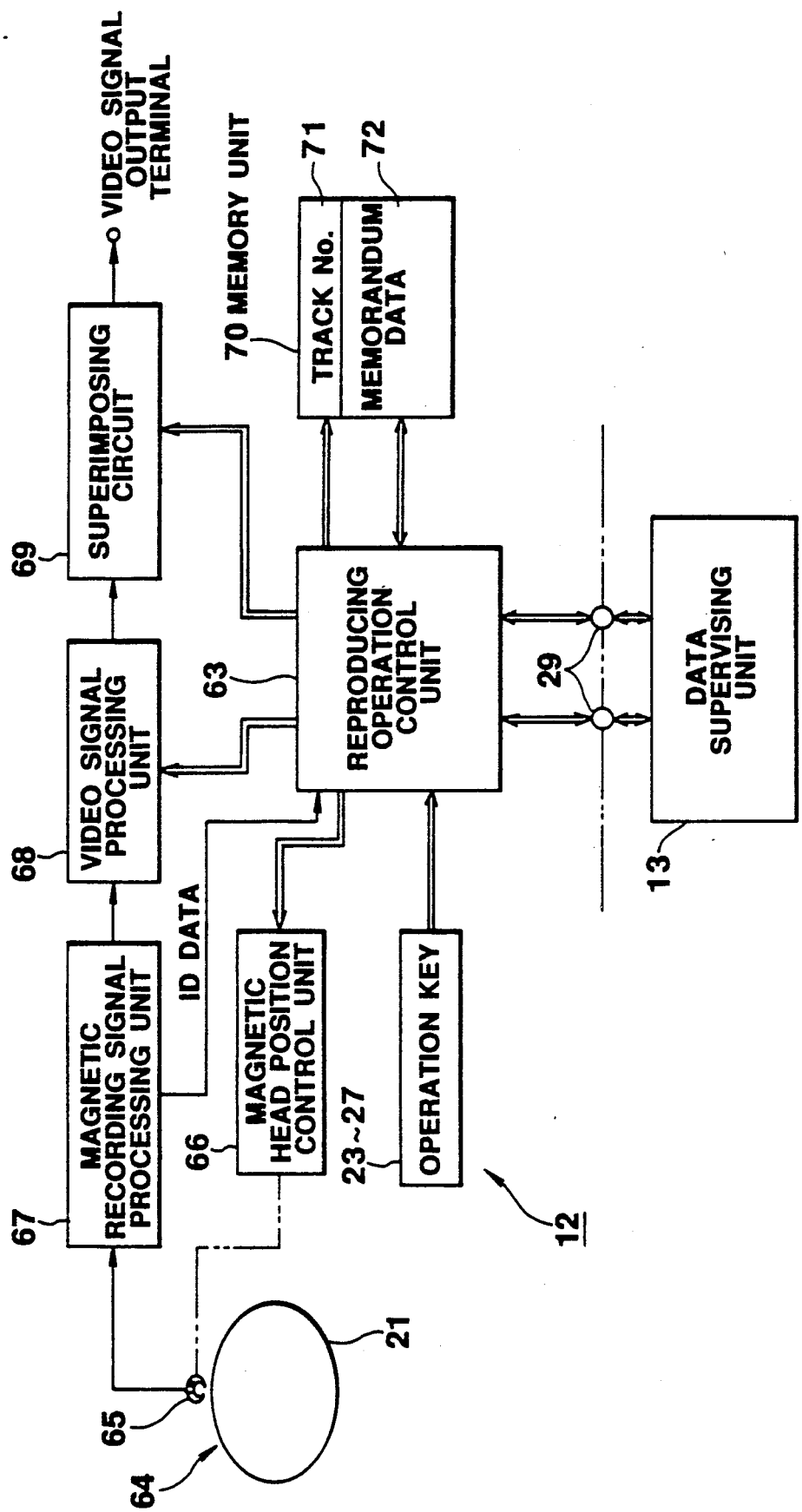
FIG. 5 is a schematic block diagram of an internal arrangement of the reproducing apparatus shown in FIG. 2.

Referring now to FIG. 5, an internal arrangement of the reproducing machine 12 will be described.

Overall operations of the reproducing machine 12 are under control of a reproducing operation control unit 63.

The reproducing operation control unit 63 outputs various control signals in response to signals supplied from the operation keys 23 to 27 and a data supervising unit 13.

The reproducing machine 12 is equipped with a magnetic reproducing device 64. The magnetic reproducing device 64 includes a magnetic head which is exclusively used for reproducing the data which has been recorded on the floppy disk 21. The relative position of this magnetic head 65 to the floppy disk 21 is controlled by a magnetic head position control unit 66 which is operated based upon the control of the reproducing operation control unit 63. The magnetic head 65 reads out the data recorded on a predetermined track of the floppy disk 21.

The data signal read out from the floppy disk 21 by way of the magnetic head 65 is supplied to a magnetic recording signal processing unit 67. This magnetic recording signal processing unit 67 amplifies the data signal supplied from the magnetic head 65, outputs the image data to the video signal processing unit 68 when the amplified data signal corresponds to the image data, and also outputs the ID data to the reproducing operation control unit 63 when the amplified data signal corresponds to the ID data.

The functions of the video signal processing unit 68 are to separate the video signal which has been supplied thereto from the magnetic recording signal processing unit 67 into the synthesized signal (Y+S) containing the luminance signal and synchronization signal and also color difference signals (R-Y) and (B−Y), and thereafter frequency-demodulates these separated signals. Furthermore, the FM-demodulated signals are converted into the NTSC signal and then the resultant NTSC signal is output to the superimposing circuit 69.

The superimposes circuit 69 superimpose the message data output from the reproducing operation control unit 63 on the NTSC color television signal supplied from the video signal processing unit 68 to produce an image signal. This image signal is then output to the video signal output terminal.

A memory unit 70 is connected to the reproducing operation control unit 63. In this memory unit 70, a track No. memory 71 and a memorandum data memory 72 are provided. The track No. data output from the data supervising unit 13 and either the message data corresponding to the track No., or timer data are supplied via the reproducing operation unit 63 to the memory unit 70 for the writing purpose.

Electronic Still Camera Operation

The operation of the above-described electronic still camera according to the first preferred embodiment will now be described.

First, an operation to photograph an object to be imaged will be described, utilizing the photographing machine 11.

Figure 6:
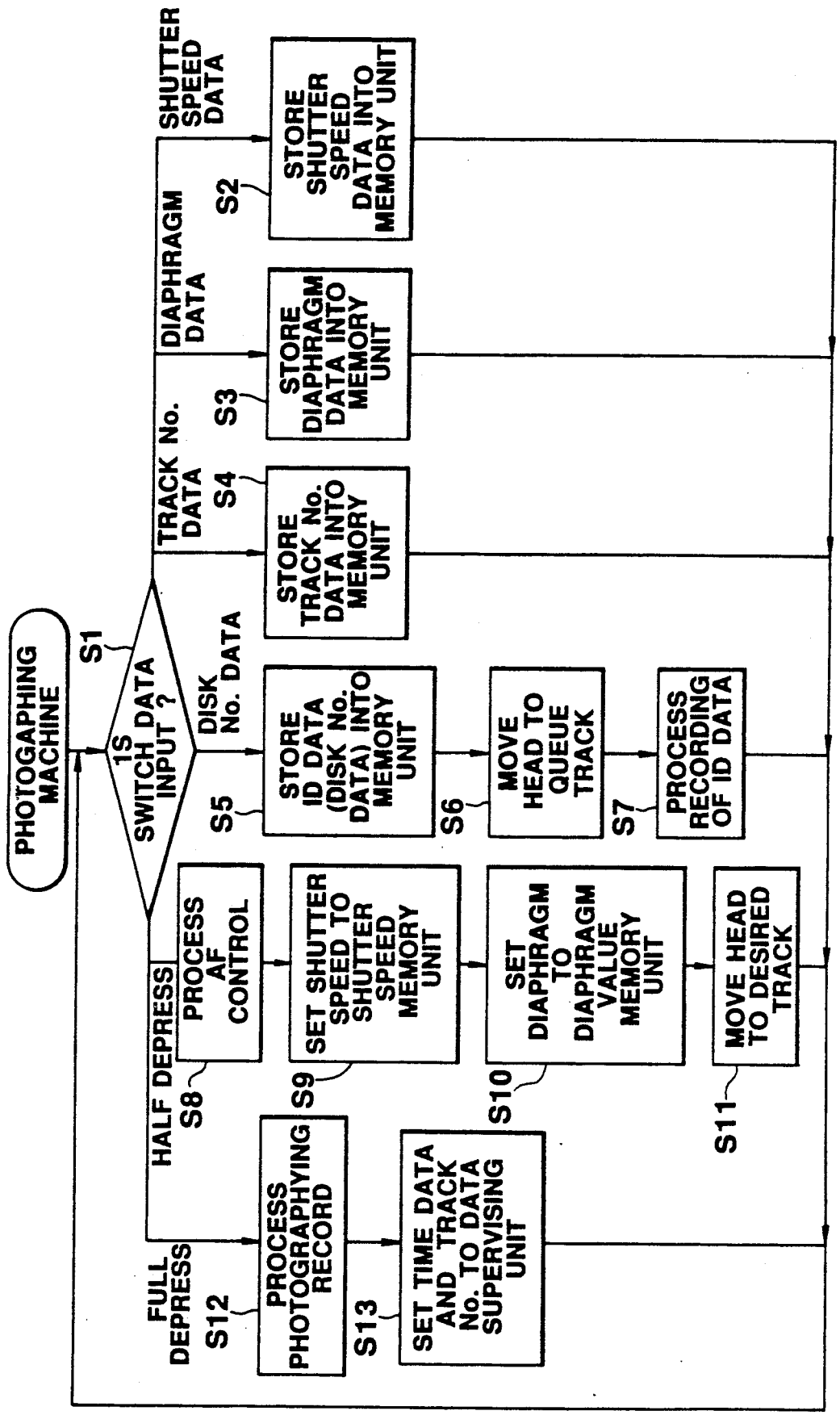
FIG. 6 is a flowchart for explaining operations while the photographing process by the photographing apparatus illustrated in FIG. 1 is performed.

The data supervising unit 13 is mounted on the supervising unit mounting unit 15 of the photographing machine 11 and then this data supervising unit 13 is set to the cooperation mode for photographing the object. FIG. 6 is a flowchart for explaining various operations of the photographing machine 11 under the above-described conditions.

Under these circumstances, in case that a user wants to set a specific shutter speed, or a diaphragm value, the numeral keys 32 and either the shutter key 34 or diaphragm key 35 provided on the data supervising unit 13 are operated so as to input either a desired shutter speed or diaphragm value. Thus, either the entered shutter speed data, or diaphragm value data is transferred via the data supervising control unit 58 in the data supervising unit 13 to the photographing operation control unit 44 and stored into the memory unit 55 (steps S1, S2, and S3).

When a still picture is recorded on a predetermined track of the floppy disk 21, a disk number is designated by manipulating the numeral key 32 and track key 37 in the data supervising unit 13. The above-described designated track number data is stored via the data supervising control unit 58 and photographing operation unit 44 to the memory unit 55 (steps S1 and S4).

It should be noted that when the track number is not designated in the data supervising unit 13, a first track (for instance, 1 track in case of an used disk) of empty tracks (namely tracks on which no still picture have been recorded) in the floppy disk 21 is stored into the memory unit 55.

In case that the floppy disk 21 mounted on the photographing machine 11 is unused, the disk number is entered by way of the numeral keys 32 and disk key 36. Then, the entered disk number data are stored via the data supervising control unit 44 to the memory unit 55, which is similar to the data storage operation of the entered data (steps S1, S5). Furthermore, under the control of the photographing operation control unit 44, the magnetic head position control unit 52, the magnetic head 51 is set to a position corresponding to the queue track (step S6). Then, the disk number data is read from the memory unit 55 and thereafter output to the magnetic recording signal processing unit 50 under the control of the photographing operation control unit 44 so that the disk number data with respect to the queue track of the floppy disk 21 is written (step S7).

On the other hand, in the data supervising unit 13, the entered disk number data is also input via the data supervising control unit 58 to the address supervising unit 59. A specific address value with respect to the data memory unit 60 is written in connection with the above-described disk number data in the address supervising unit 59, which is simultaneously performed with the above-explained data process.

When an object to be imaged is actually photographed by utilizing the photographing machine 11, the user manipulates the release switch 17 while viewing a finder 14 thereof, similar to a conventional photographing camera.

When the release switch 17 is depressed at its half moving path and therefore only the first switch 17a is under the ON state, an AF control process is performed under the control of the photographing operation control unit 44 (step C8). That is, the photographing operation control unit 44 controls the lens position (not shown in detail) of the optical unit 46 based upon the data output from the distance measuring unit 54 so as to achieve an on-focus condition.

Thereafter, the photographing operation control unit 44 sets both the shutter speed and diaphragm value (steps S9 and S10). In other words, when the shutter speed data has been input into the memory unit 55, this data is set as the shutter speed data, whereas when the shutter speed data has not yet been input into the memory unit 55, but either the data output from the distance measuring unit 53, or the diaphragm value has been stored in the memory unit 55, a desired shutter speed is calculated and set based on this diaphragm value and the data from the distance measuring unit 53 under the control of the photographing control unit 44.

Even when the diaphragm value is set, in case that the diaphragm value has been input into the memory unit 55, the photographing operation control unit 44 sets this data as a desired diaphragm value. To the contrary, in case that the diaphragm value has not yet been set in the memory unit 55, a desired diaphragm value is calculated and set based on the data from the distance measuring unit 53 and the set shutter speed data in order to set the diaphragm (not shown in detail) provided in the optical system 46 under the control of the photographing operation control unit 44, which is similar to the above-described setting operation. In addition, the photographing operation control unit 44 controls the magnetic head position control unit 58 so as to move the magnetic head 51 to a desired track based on the track number data which has been stored in the memory unit 55 under such a condition that the release switch 17 is depressed along its half moving path (step S11).

Thereafter, when the release switch 17 is depressed along its full travel path, both the first and second switches 17a and 17b are turned ON, and the photographing operation control unit 44 performs the photographing recording process (step S12). That is, the shutter 47 is driven in response to the shutter speed which has been set during the previous operation under the control of the photographing operation control unit 44. Furthermore, this photographing operation control unit 44 supplies the drive signal to the image sensor 48. In the video signal processing unit 49, the video signal supplied from the image sensor 49 is FM-modulated and thereafter the FM-modulated video signal is output to the magnetic signal processing unit 50. The above-described magnetic signal processing unit 50 outputs the write signal corresponding to the video signal which has been supplied from the image signal processing unit 49, to the magnetic head 51, and thus performs the image data write process to the floppy disk 21.

Under the control of the photographing operation control unit 44, after the above-described photograph recording process is accomplished, the year/month/day data are read from the clock unit 56 and the track number data is read from the memory unit 55, and then these data are output to the data supervising unit 13.

In this data supervising unit 13, the above-described track number data is stored together with specific address data of the data memory unit 60 to the address supervising unit 59 and also the above-explained year/month/day data are stored at the address of the data memory unit 60 which is determined by the address supervising unit 59.

Single Operation Mode

Figure 7:
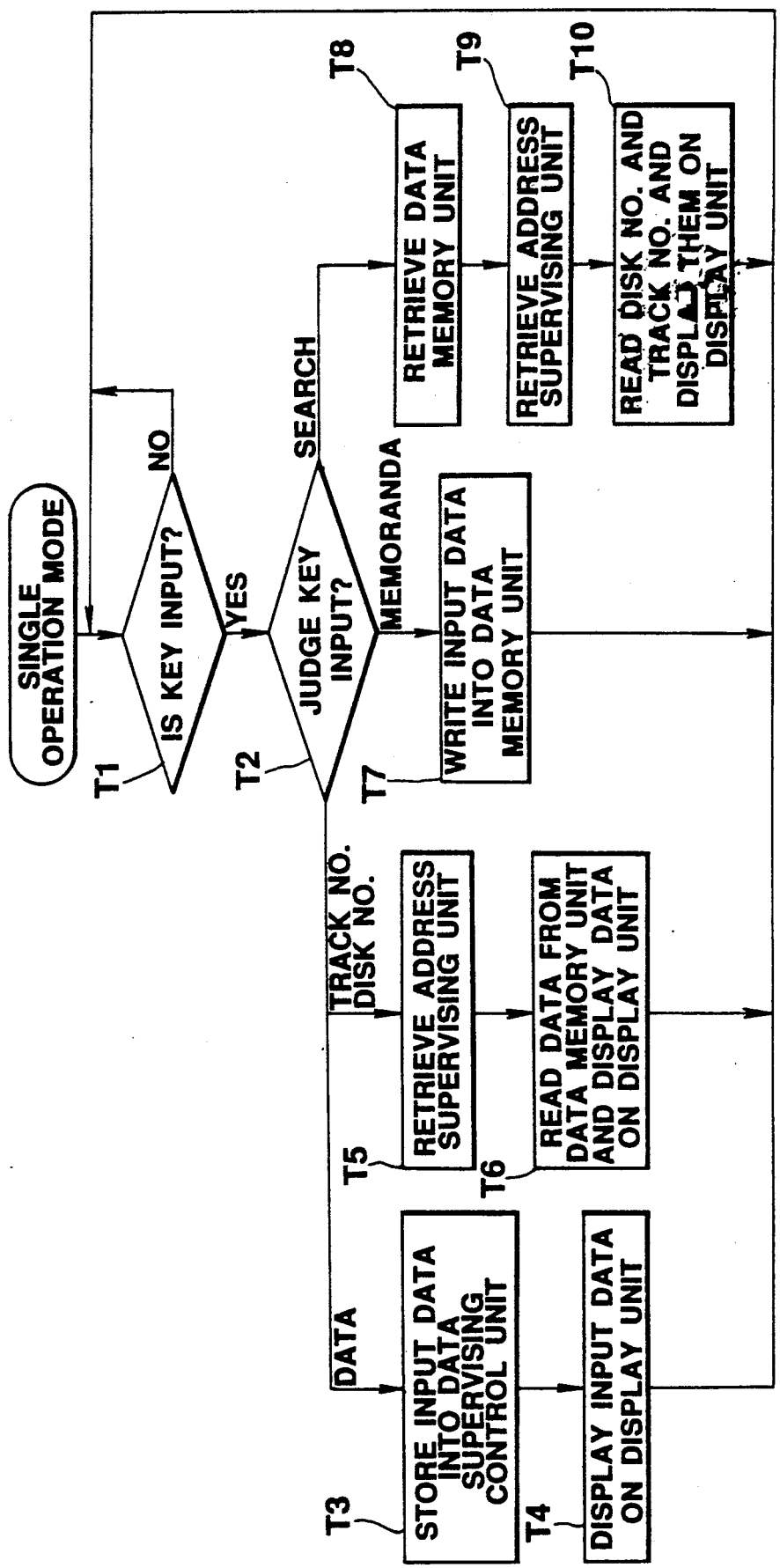
FIG. 7 is a flowchart for explaining operations while the data supervising unit shown in FIG. 3 is performed in the single mode for the data process.

Referring now to FIG. 7, an operation on the data supervising unit 13 in a single operation mode will be described.

In the flowchart shown in FIG. 7, first, when the data supervising unit 13 is set in the single operation mode, it becomes a key input waiting condition (step T1). Then, when any one of the key 30 is operated, a judgement is made in the data supervising control unit 58 which key is manipulated (step T2). As a result of the above-described key judgement, if the operated key corresponds to either the numeral key 32, or character entry key 33, the input data relating to the operation of either the numeral key 32, or character entry key 33 is stored in an input buffer (not shown) of the data supervising control unit 58 (step T3), and furthermore is displayed on the display unit 31 (step T4). Also as a result of the above-described key judgement, if a judgement is made on a fact that either the disk key 36 or track key 37 is manipulated, based on the data which has been stored in the above input buffer, either the disk number or track number which has been stored in the number memory 61 of the address supervising unit 59 is retrieved (step T5). When either the disk number or track number coincident with the data stored in this input buffer is detected, the address data which has been stored in the address memory unit 62 in correspondence with this detected disk number or track number is read out therefrom, and then the data memory unit 60 is addressed in accordance with this read data. Then, the data which has been stored in the data memory unit 60 is read out to be displayed on the display unit 31 (step T6).

When the memorandom key 28 is operated, the data which has been stored in the input buffer of the data supervising control unit 58 is written into the data memory unit 60 (step T7).

Furthermore, when the search key 41 is operated, based upon the data which has been stored in the above-described input buffer, data in the data memory unit 60 is retrieved (step T8). Subsequently, when data which is coincident with the data stored in this input buffer is detected, the address memory unit 62 of the address supervising unit 59 is retrieved based upon the address value by which this data has been stored (step T9). Then, when address data is detected which is coincident with the address value of the address memory unit 62 into which the above-described retrieved data has been stored, the disk number and track number which have been stored in the number memory unit 61 in accordance with the detected address data are read and displayed on the display unit 31 (step T10).

As previously described, in accordance with data supervising unit 13, the message data and the like corresponding to the disk number and track number can be entered in the single operation mode, and also when either the track number or disk number is entered, the message data which has been input in accordance with either the disk number or track number can be retrieved and displayed. Conversely, based upon the message data, the disk number and track number corresponding to this message data can be retrieved and displayed.

As a result of the above-described features of the present invention, any user can readily recognize the various information corresponding to the image data which have been recorded on the respective floppy disks by employing the data supervising unit 13, and also can easily grasp the disk number and track number of the floppy disk on which the desirable image data has been recorded.

Image Data Reproduction

Figure 8:
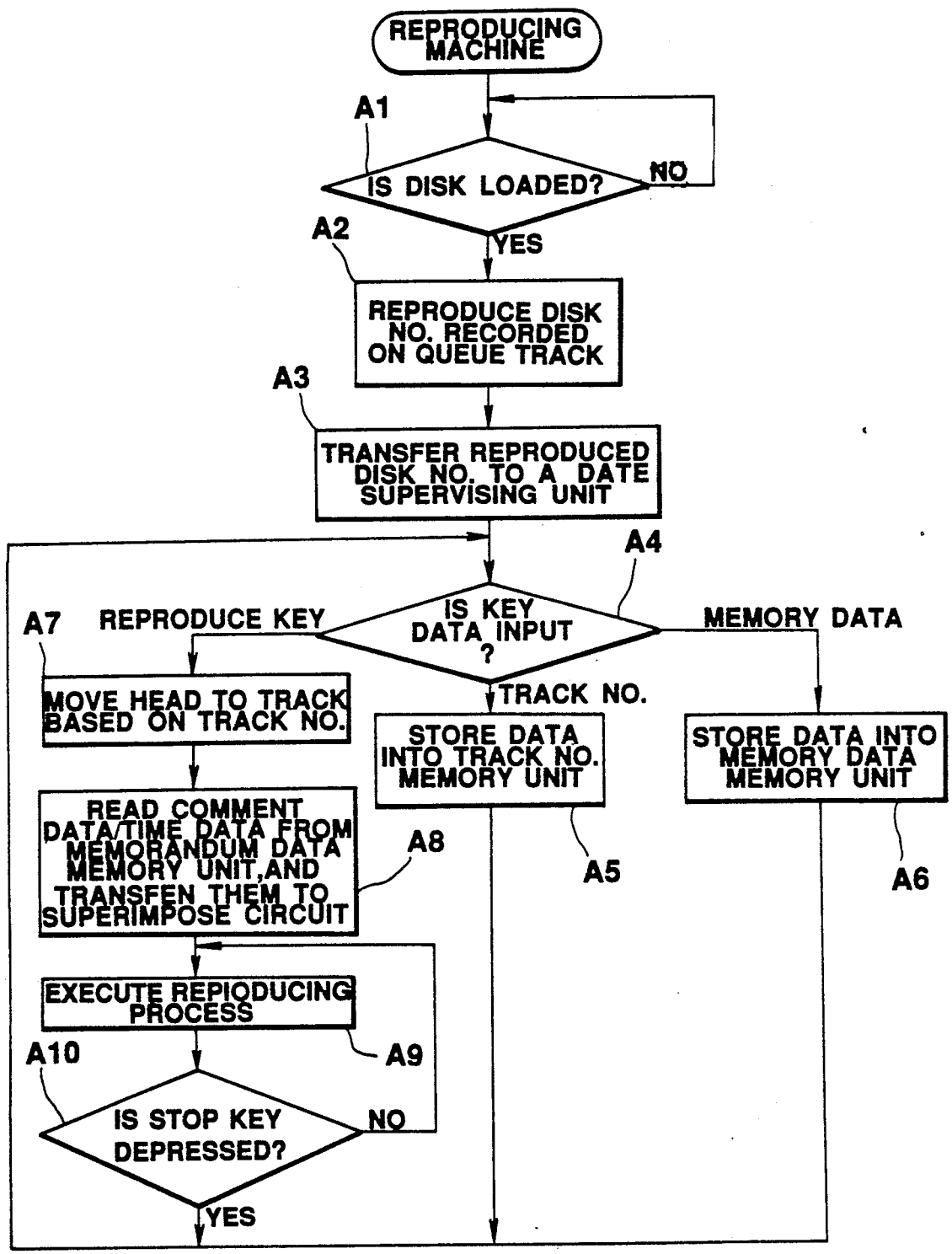
FIG. 8 is a flowchart for explaining the reproducing process by the reproducing apparatus shown in FIG. 2.

With utilization of the reproducing machine 12, the image data reproduction will now be described for data which have been recorded on the floppy disk 21, with reference to the flowchart shown in FIG. 8.

In case that the image data which have been stored on the floppy disk 21 are reproduced by the reproducing machine 12, the data supervising unit 13 is mounted on the supervising unit mounting unit 28 of the reproducing machine 12. Thus, the data supervising unit 13 is set to the cooperation mode by way of the mode key 43.

At the next step, the floppy disk 21 on which the still images have been recorded by the photographing machine 11 is inserted into the FD insertion unit 22 of the reproducing machine 12. Then, in this reproducing machine 12, a detection is made that the loading of the floppy disk 21 has been completed on the magnetic disk apparatus 22 (step A1), the magnetic head 65 is controlled to be moved to the queue track position by operating the magnetic head position control unit 66, and then the disk number data which has been recorded on this queue track position is reproduced (step A2). The reproduced disk number data of this floppy disk 21 is transferred to the data supervising control unit 58 in the data supervising unit 13 (step A3). The data supervising control unit 58 retrieves the number memory unit 61 of the address supervising unit 59 based upon the above-described reproduced disk number data, and a check is made whether or not the reproduced disk number corresponds to the floppy disk 21 which has been recorded on the data supervising unit 13 while the still image data have been previously recorded.

After the above-explained disk number checking process has been accomplished, when the track number is input in the data supervising unit 13, track number data of a track of the floppy disk 21 waiting for data reproduction (in case of no designation, track "1") is transferred and stored in the track number memory 71 of the reproducing machine 12 (step A5). In the data supervising unit 13, in response to the key operation of the transfer key 39, the memory address of the data memory unit 60 corresponding to the input track number is read out from the address memory unit 62 of the address supervising unit 59. As a result, both the comment data and time data which have been stored at the above address of the data memory unit 60, are read out therefrom and then transferred to the reproducing machine 12. In, on the other hand, the reproducing machine 12, when the comment data and time data are transferred, these data are stored into the memorandum data memory 72 (step A6).

Now, when the reproducing key 25 of the reproducing machine 12 is operated, based upon the track number data which has been stored in the track number memory 71 at the above step A5, the magnetic head 65 is moved to the designated track position under the control of the magnetic head position control unit 66 (step A7). Then, both the comment data and time data corresponding to the designated disk track which have been transferred and stored into the memorandum data memory unit 72 in the previous step A6, are supplied via the reproduction control unit 63 to the superimpose circuit 69 (step A8). In conjunction therewith, the still picture data which should be recorded on the designated track of the floppy disk is supplied via the magnetic head 65, magnetic recording signal process unit 67 and video signal processing unit 68 to the superimpose circuit 69. In this superimpose circuit 69, these comment data and time data are synthesized with the video data, and the synthesized signal is output from a video signal output terminal to a television receiver (not shown) for reproduction (step A9). Then, the reproducing machine 12 continues to reproduce the synthesized video signal until the stop key 26 is operated. When the stop key 26 is manipulated, the reproduction process is accomplished and the reproducing machine is brought into the key operation waiting condition (step A10).

As a result, during the recording process of the still picture data, both the comment data and time data which have been previously stored into the data memory unit 60 of the data supervising unit 13 in relation to the respective still picture recording track of the floppy disk, can be superimposed with the still picture data to be reproduced.

As previously described, in accordance with the electronic still camera system with the above-described arrangements, since the comment data, time data, and the like corresponding to the respective still picture recording track of the floppy disk 21 can be supervised as a whole by utilizing the address supervising unit 59 and data memory unit 60 in the data supervising unit 13, it is possible to reproduce the synthesized video signal after the comment data and time data have been synthesized with the corresponding still picture data, while reproducing the respective recording track.

Arrangement Of Second Electronic Still Camera System

An electronic still camera system according to a second preferred embodiment of the invention will now be described.

It should be noted that the same reference numerals used in connection with the first preferred embodiment will be employed as those for denoting the same or similar circuit elements in the following second preferred embodiment and no further explanation thereof is made.

The electronic still camera system according to the second preferred embodiment comprises a photographing machine and electronic note book. First of all, an arrangement of the photographing machine will now be described.

Figure 9:
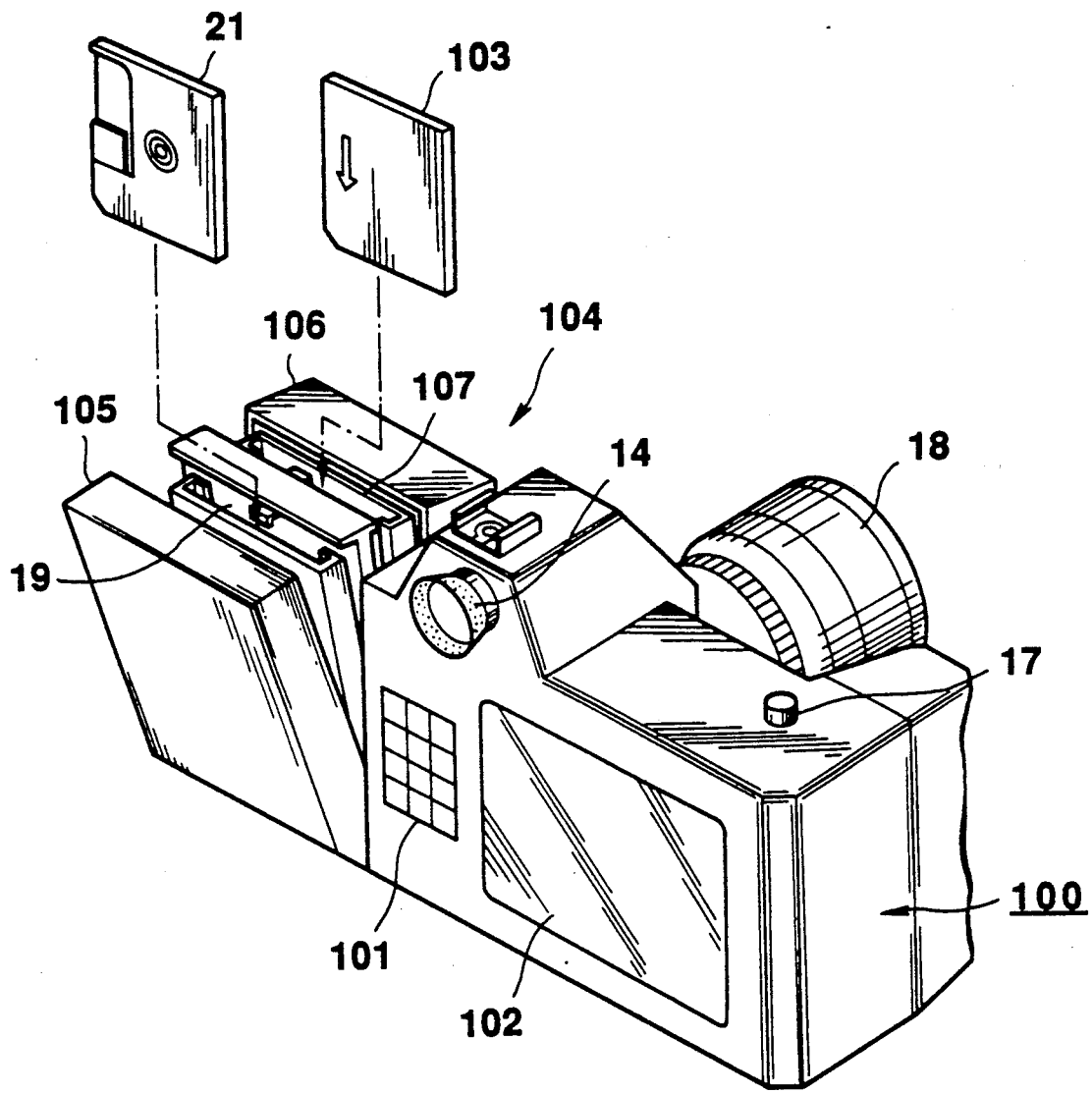
FIG. 9 is a perspective view of a photographing apparatus and an IC card for an electronic still camera system according to a second preferred embodiment of the present invention.

In FIG. 9, there is shown a perspective view of a back side of the photographing machine 100 to which the present invention has been applied.

In the photographing machine shown in FIG. 9, there are provided: a release switch 17 functioning as a shutter and formed on a top surface; a finder 14 for viewing therethrough an object to be photographed, formed on a rear surface; a monitor, e.g., a liquid crystal display panel 102 for displaying a key input unit 101 to designate operation mode or the like, and a photographed image; a floppy disk 21 mounted on a side surface and functioning as a magnetic recording medium on which, for instance, 50 sheets of still image information can be magnetically recorded; and an IC card 103 including a semiconductor memory for storing photographed index information. Both the floppy disk 21 and IC card 103 are stored in a magnetic recording apparatus unit 104.

As is seen from FIG. 9, both the floppy disk 21 and IC card 103 are constructed as a single unit detachably mounted on the electronic still camera 100. To this end, two covers 105 and 106 are formed on this magnetic recording apparatus unit 104, which are opened when the floppy disk 21 and IC card 103 are inserted and removed from the magnetic recording apparatus unit 104. When these covers 105 and 106 are opened, both an insertion opening 19 of the floppy disk 21 and another insertion opening 107 of the IC card are exposed at the upper sides.

Circuit Arrangement Of Photographing Machine

Figure 10:
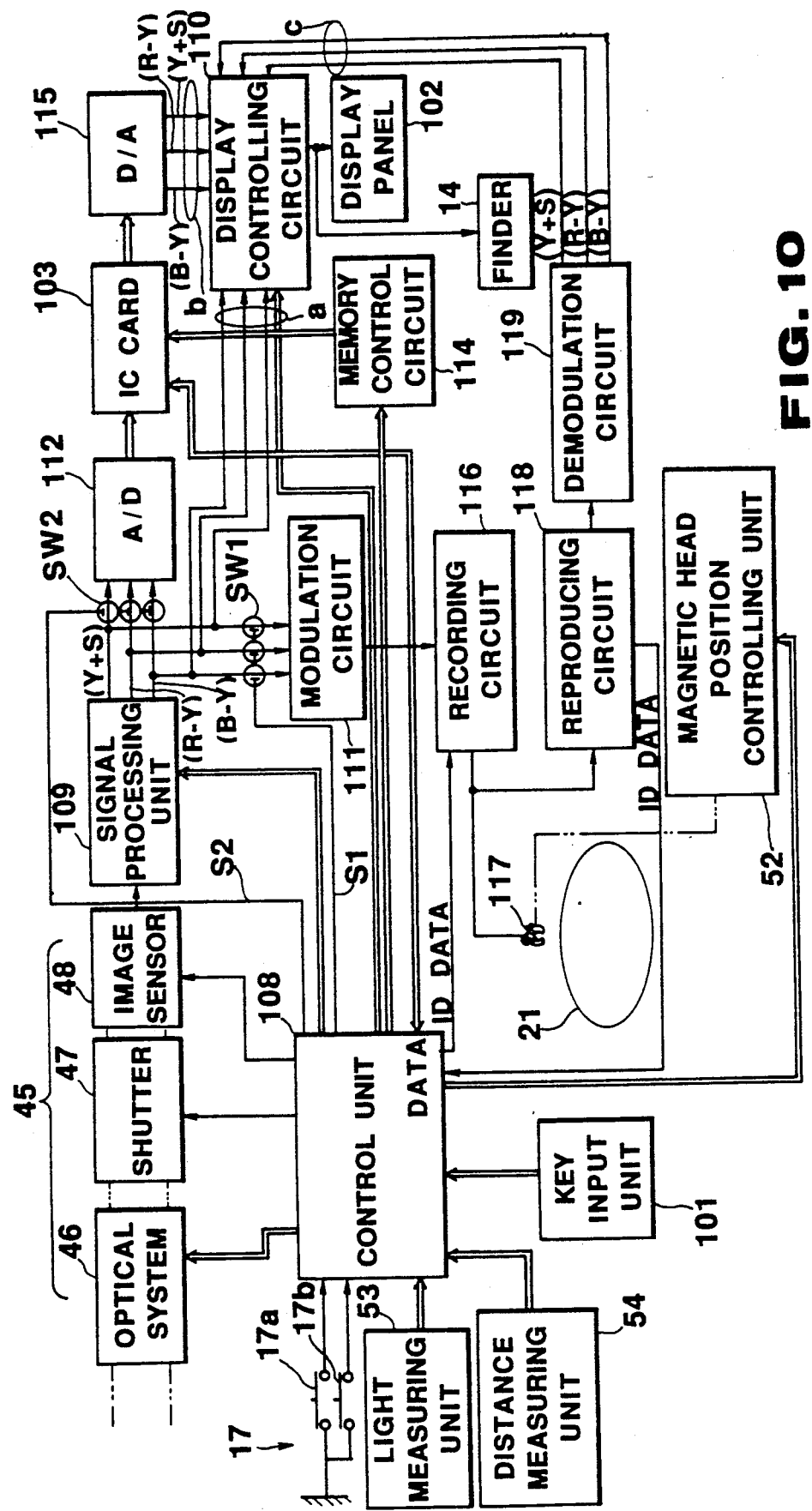
FIG. 10 is a schematic block diagram of an internal arrangement of the photographing apparatus shown in FIG. 9.

FIG. 10 represents an entire circuit arrangement of the photographing machine 100 shown in FIG. 9.

Reference numeral 45 indicates a photographing unit which has been constructed the same as that of the first preferred embodiment. The photographing unit 45 comprises an optical system 46, a shutter 47 and an image sensor 48, which are under the control of the control unit 108.

An output signal (picture signal) of the image sensor 48 is transferred to a signal processing unit 109. The signal processing unit 109 produces a synthesized picture signal from a luminance signal and a synchronization signal, such as a (Y+S) signal, and color difference signals (R−Y), (R−Y) based on the image signal derived from the image sensor 48.

The synthesized picture signal output from the signal processing circuit 109 is transferred via a signal line "a" to a display controlling circuit 110, and transferred via a switch SW1 to a modulation circuit 111 and also via a switch SW2 to an A/D converting circuit 112. These switches SW1, SW2 are ON/OFF-controlled in response to switch signals S1 and S2. The A/D converting circuit 112 converts the luminance signal (Y+S) and color difference signals (R−Y), (B−Y) sent from the signal processing circuit 109 into corresponding digital data, and outputs the digital data to the IC card 103. In this IC card 103, the digital picture data which are sent from the A/D converting circuit 112 are stored under the control of the memory control circuit 114. To this memory control circuit 114, another control signal derived from the control unit 108 is supplied. In a key input unit 101, there are provided a data input key for inputting photograph index information (i.e., message information), an operation mode designation key for instructing various operation modes such as a photograph mode, reproduction mode, and IC card read/write mode; forward key/backward key for forwarding/backwarding the readout track of either the IC card 103 or floppy disk 21; and/or various operation keys for directly designating the track number as a track number designation key. The functions of the memory control circuit 114 are to perform a write control of the photograph index information which is input from the key input unit 101 via the control unit 108 to the IC card 113, and also to execute a write control of the image data to the IC card 103 when a control signal corresponding to the ON signal of the release switch 17 from the control unit 108 is supplied thereto in case that the instruction has been made on the write operation of the image data from the key input unit 101.

When the index read mode is designated by the key input unit 101, the memory control circuit 114 reads the storage data of the IC card 103 and inputs this storage data into a D/A converting circuit 115. The photograph index information read out from the IC card 103 is converted by the D/A converting circuit 115 into a correponding analog signal and sent via a signal line "b" to a display control circuit 110.

The modulation circuit 111 modulates the signal supplied from the signal processing circuit 109 via the switch SW1, and outputs the modulated signal to a recording circuit 116. This recording circuit 116 drives the magnetic head 117 in response to the signal sent from the modulation circuit 111, and records the image information on the floppy disk 21 in such a manner that a toroidal track is formed on the floppy disk 21.

The image information which have been recorded on the floppy disk 21 are read therefrom via the magnetic head 117 in the reproduction mode, and then are transferred via the reproducing circuit 118 to the demodulating circuit 119. The demodulating circuit 119 demodulates the reproduced signal to obtain the luminance signal (Y+S) and color difference signals (R−Y), (B−Y) and outputs these signals to the display control circuit 110. The display control circuit 110 selects the image signals which are input from three signal lines "a", "b", and "c" in accordance with the instruction given from the control unit 108, and outputs to the finder 14 and liquid crystal display panel 102, the image data produced from the image sensor 48 with the image data recorded on the floppy disk 21, the data stored in the IC card 103, or the synthesized data of the image data with the data stored in the IC card 103. In case that the reproduced data corresponds to the data recorded on the queue track of the floppy disk 21, the reproducing circuit 118 outputs this data as ID data to the control unit 108.

To the control unit 108, the shutter signal is supplied from the release switch 17, and the above-described key input unit 101 is connected. In response to the key input signal from the key input unit 101 and shutter signal from the release switch 17, the control unit 108 turns ON/OFF the switches SW1, SW2, and furnishes control instructions to the memory control circuit 114, display control circuit 110, and other circuits. Furthermore, the control unit 108 outputs the disk number data to the recording circuit 116 when the disk number data is input from the key input unit 101, and moves the magnetic head 117 to the queue track position under the control of the magnetic head position control unit 52 so as to write the disk number data onto the queue track.

Photographing Operation Of Second Electronic Still Camera System

When the photographing machine 100 with the above arrangement is operated, the photograph mode is designated by operating the key of the key input unit 101. The control unit 108 turns ON/OFF the switches SW1, SW2 when the photograph mode is designated, and instructs the display control circuit 110 so as to select the signal line "a" whereby the output signal is supplied to the finder 14. Under these conditions, when a photographer depresses the release switch 17 over a half travel distance, and turns ON the first switch 17a, the photographing machine 100 is brought to the standby mode. Then, both the autofocus control and the exposure control are performed so as to determine the desirable focus and exposure, and also the shutter 47 is operated every 1/60 seconds. As a result, an image of an object to be imaged is focused onto the input surface of the imaging elements via the optical path 46 and shutter 47, and the luminance signal (Y+S) and also color difference signals (R−Y), (B−Y) corresponding to the focused image are output from the image sensor 48 and further transferred via the signal line "a" to the display control circuit 110. The display control circuit 110 selects the signals sent from the signal line "a" in accordance with the instruction given from the control circuit 108, and the selected signal is displayed on the finder 14. The photographer can confirm the conditions of the object to be imaged by way of the displayed information on the finder 14, whereby he can operate the shutter.

Then, when the photographer depresses the release switch 17 for the full travel distance, and then the ON signal of the second switch 17b is transferred to the control unit 108. Upon receipt of this ON signal, the control unit 108 outputs the control signal to the memory control circuit 114. In addition, the control unit 108 turns ON the switch SW1 for a predetermined time period, e.g., 1/60 seconds upon receipt of the ON signal from the second switch 17b. When the switch SW1 is turned ON, the output signals from the signal processing circuit 109 when the release switch 17 is turned ON, i.e., the luminance signal "Y" and color difference signals (R−Y), (B−Y) are input into the modulation circuit 111. The modulation circuit 111 modulates the image signal transferred from the signal processing circuit 109 and outputs the modulated image signal to the recording circuit 116. In response to the modulated image signal supplied from the modulation circuit 111, the recording circuit 116 drives the magnetic head 117 so as to record the image information on the toroidal track of the floppy disk 21.

The write mode of the IC card 103 is designated by way of the key operation of the key input unit 101 so as to input the index information.

At this time, in case that the data key input by the key input unit 101 corresponds to the disk number, the control unit 108 writes this disk number data to the IC card 113, and then moves the magnetic head 117 to the position corresponding to the queue track of floppy disk 21 under the control of the magnetic head position controlling unit 52 so as to write the disk number data on the queue track. Other key input data entered by the key input unit 101 are stored only in the IC card 103.

Arrangement Of IC Card

Figure 11:
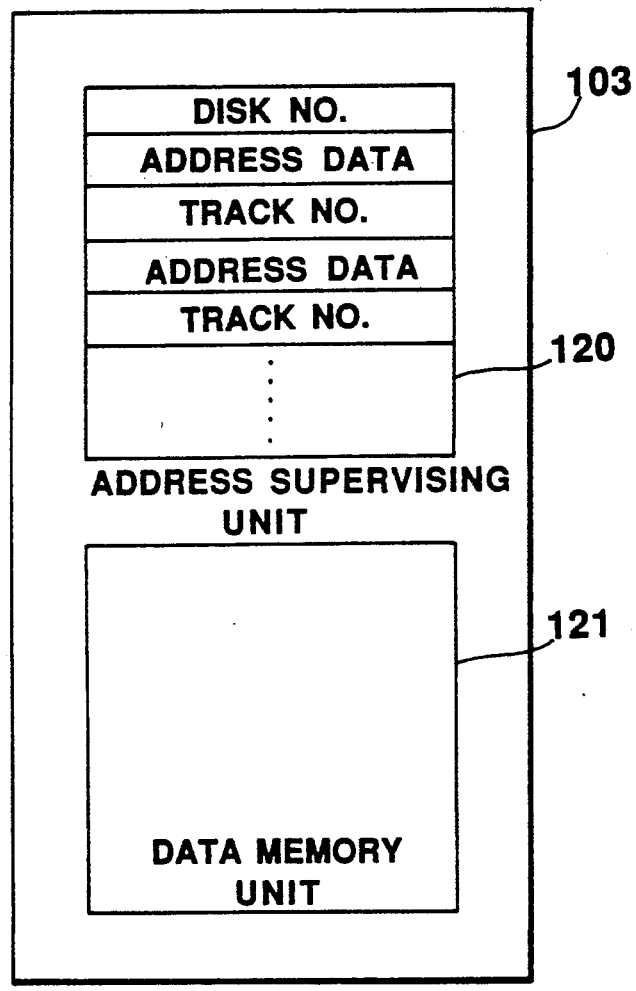
FIG. 11 is a schematic block diagram of an internal arrangement of the IC card shown in FIG. 9.
Figure 12:
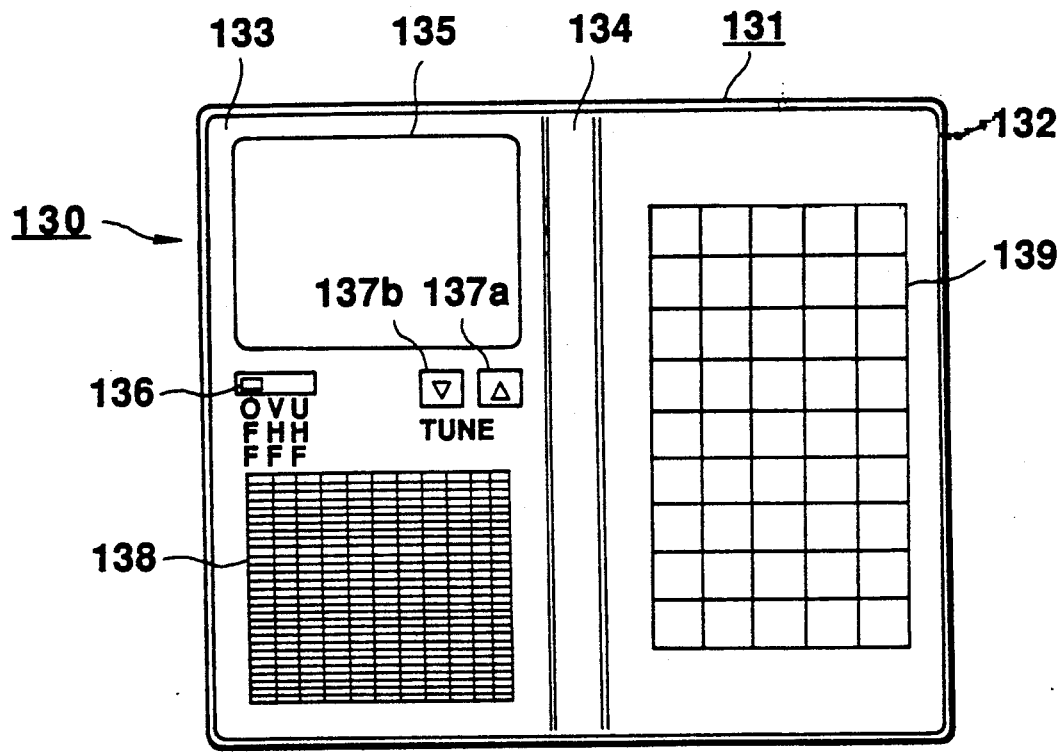
FIGS. 12A and 12B are perspective views an electronic note book for the electronic still camera system according to the second preferred embodiment of the invention.
Figure 12:
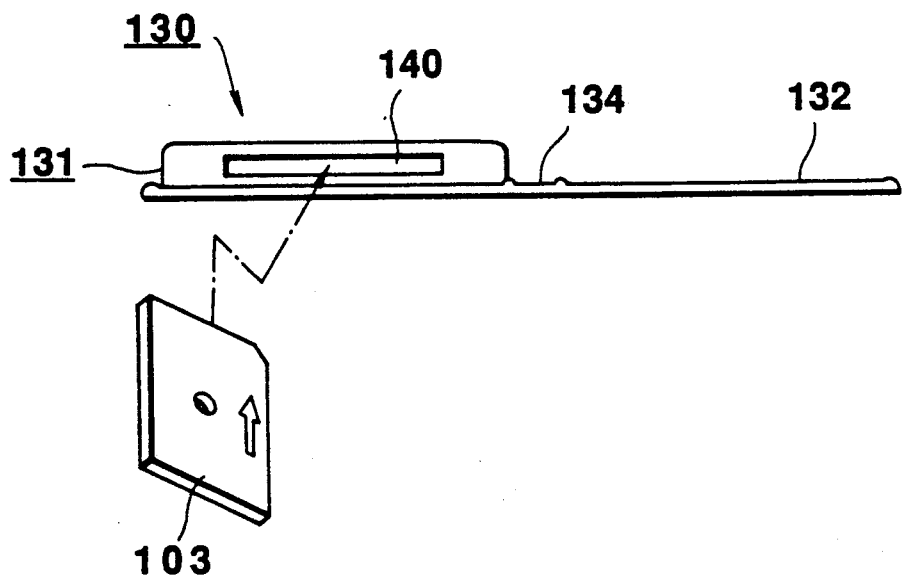

FIG. 11 shows a memory arrangement of the IC card 103.

In general, the IC card 103 comprises an address supervising unit 120 and a data memory unit 121.

In the address supervising unit 120, both the disk number data and track number data are stored, and also the address data of the data memory unit 121 is stored into which the index information of the image data that have been recorded at the disk number or track number is stored.

On the other hand, the data memory unit 121 stores either the index information which is arbitrarily input by the key operation, or the index image information which is input via the A/D converting unit 112.

Thus, when either the disk number or track number is input by the key input unit 101 in the write mode of the IC and 103, the control unit 108 retrieves data in the address supervising unit 120 by controlling the memory control circuit 114 so as to obtain the address data of the data memory unit 121.

The control unit 108 outputs the address data obtained from the address supervising unit 120 to the memory control unit 114 so as to handle this data as a write address of the index data which is subsequently input.

It should be noted that if the address data is desired to be modified in case that, for instance, the data has been already input at the memory area instructed by the data memory unit 121, this address data can be arbitrarily changed by using a cursor key (not shown in detail) of the key input unit 101.

When the index image data is recorded in the data memory unit 121, the index image recording mode is designated when the photographing operation is carried out. When this index information recording mode is instructed, the control unit 108 turns on the switches SW1, SW2 when the release switch 17 is depressed. When the switch SW1 is turned on, the photographing image is recorded on the floppy disk 21, as previously described, and also the image signal output from the signal processing circuit 37 is input via the switch SW2 into the A/D converting circuit 112, whereby the corresponding digital image data is obtained. Then, the image data output from this A/D converting circuit 112 is written into the IC card 103 under the control of the memory control circuit 114.

When the index information stored in the IC card 103, as previously described, is to be confirmed, the desired disk number or track number is key-input. When the desired disk number or track number is key-inputted, the control circuit 108 instructs the display control circuit 110 to select the signal line "b" to output the signal to the finder 14 and liquid crystal display panel 102.

The memory control circuit 114, on the other hand, designates the address of the address supervising unit 120 for the IC card 103, as previously described. Then, the control unit 108 performs the retrieve process based on the input disk number or track number so as to obtain the address data of the data memory unit 121, whereby the index information which have been stored in the above-described address of the data memory unit 121 is retrieved. Therefore, the index information is output via the D/A converting circuit 45 and signal line "b" to the display control circuit 110 so as to be displayed on the finder 14 and liquid crystal panel 102. Under these conditions, when the forward key of the key input unit 15 is operated, the information stored in the IC card 103 are sequentially read out under the control of the memory control circuit 114, and subsequently displayed via the display control circuit 110 to the finder 14 and liquid crystal display panel 102. As a result, the index information stored in the IC card 103 can be confirmed.

When the image data recorder on the floppy disk 21 is reproduced, the reproduction mode is designated. Upon designation of the reproduction mode, the control unit 108 instructs the display control circuit 110 to select the signal line "c" so as to output the data to the finder 14 and liquid crystal display panel 102. Further, either the first image data/recorded on the floppy disk 21, or the image data recorded on the track designated by the key input unit 101 is read by the reproducing head 117, and amplified by the reproducing circuit 118, and thereafter input into the demodulation circuit 119 for demodulating purposes. The luminance signal (Y+S) and color difference signals (R−Y), (B−Y) which have been demodulated by this demodulation circuit 119 are transferred via the signal line "c" to the display control circuit 110. This display control circuit 110 selects the image signal transferred from the demodulation circuit 119 in accordance with the instruction by the control circuit 108 and is displayed on the finder 14 and liquid crystal display panel 102. Also under these conditions, the recorded image data of the floppy disk 21 are sequentially read by operating the forward key, and then displayed on the finder 14 and liquid crystal display panel 102.

In case that the data which has been stored in the IC card 103 is superimposed with the image data which has been recorded on the floppy disk 21, the superimposing mode is designated. In this superimposing mode, the control unit 108 instructs the display control circuit 110 to select the signal lines "b" and "c", and controls the memory control circuit 114 in order to obtain the address data of the data memory unit 121 in the IC card 103 in relation to the reproducing track number. Similarly to the above-described operation, the control unit 108 instruct the display control circuit 110 to output the image data which has been recorded on the floppy disk 21, and also reads the data stored in the IC card 103 in response to the address data to be output to the display control circuit 110.

The function of the display control circuit 110 is, on the other hand, to synthesize the data supplied from the IC card 103 with the image data supplied from the floppy disk 21 to thereby output the synthesized data to the finder 14 and display panel 102.

Arrangement Of Electronic Note Book

An arrangement of the electronic note book will now be described, where the IC card 103 which has just taken out from the above-described photographing machine 100 is set so as to display the image stored in the IC card 103. The electronic note book is equipped with both the color liquid crystal display type television function and also the data bank function. The arrangement of this electronic note book is shown in FIGS. 12A to 14.

FIGS. 12A and 12B are perspective views of an electronic note book 130 to which the present invention is applied. More specifically, FIG. 12A illustrates the opened electronic note book, whereas FIG. 12B is a bottom view thereof. In FIGS. 12A and 12B, reference numeral 131 denotes a case, i.e., a note book style, which comprises a front cover 132 and a case body 133. The case body 133 is provided inside the front cover 132, and is positioned at the left-sided page when the electronic note book is opened. A hinge unit 134 is formed on the front cover 132 in the longitudinal direction of the center portion thereof so as to open/close the front cover 132 in the right and left directions.

At a front surface of the case body 133, a color liquid crystal display panel 135 is positioned at an upper portion thereof and also a television power switch 136, an up key 137a and down key 137b for tuning purposes of the television, and a speaker 138 are provided at a lower portion thereof. The television power switch 136 is used to turn ON/OFF a main source of a television, and also to select a VHF/UHF reception mode while turning on the television. Under the lower portion of the case body 133, an IC card insertion opening 140 is provided as shown in FIG. 12B. The IC card 103 is insertable into the IC card insert opening 140 so that the information stored therein is read by the internal circuit.

A keyboard 139 is mounted on the right-sided page inside the front cover 132, and is connected to an electronic circuit within the case body 132. Various input keys for processing the various data, and mode keys and the like for switching over the data process mode and television mode are formed on this keyboard 139.

Circuit Arrangement Of Second Electronic Note Book System

Figure 13:
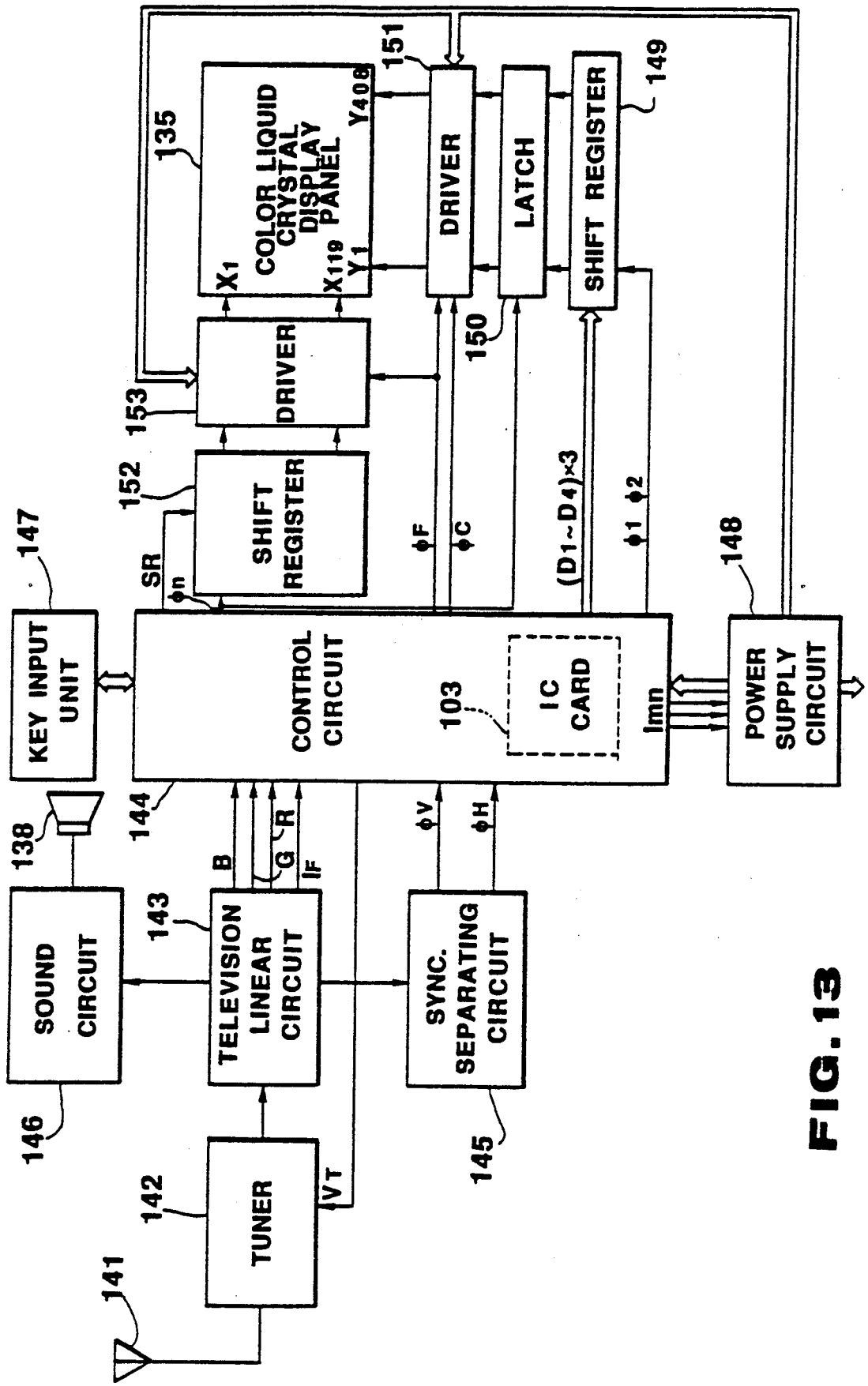
FIG. 13 is a schematic block diagram of an internal circuit arrangement of the electronic note book shown in FIGS. 12A and 12B.

In FIG. 13, there is shown a circuit arrangement of an electronic circuit employed in the above-described case body 133. In the circuit shown in FIG. 13, an antenna 141 is connected to a tuner 142. The tuner 142 selects the designated channel from the received television waves by the antenna 141, amplifies the tuned signal and then converts the amplified television signal into the intermediate frequency (IF) signal, which will be output to a television linear circuit 143. The function of this television linear circuit 143 is to amplify the intermediate frequency signal supplied from the tuner 142 and to perform both the picture detection and color signal process, whereby both the intermediate frequency signal IF and color signals "R", "G", "B" are output to a control circuit 144. This control circuit 144 controls both the display operation of the television picture (video) signal and the control of the data processing unit (data bank), and also controls the read operation of the information of the IC card 103 inserted into the IC card insertion opening 140 (will be discussed in detail). The television linear circuit 143 outputs the composite picture signal containing the synchronization signal to a sync separating circuit 145 and the sound signal to a sound circuit 146. The function of the sound circuit 146 is to detect the sound signal supplied from the television linear circuit 143 and to amplify the sound signal so as to drive the speaker 138.

On the other hand, the sync separating circuit 145 separates the vertical sync signal $\phi_V$ and horizontal sync signal $\phi_H$ from the composite picture signal so as to be output to the control circuit 144. To this control circuit 144, a key input unit 147 and a power supply circuit 148 are further connected. The key input unit 147 is arranged by the above-described television power switch 136, up key 137a, down key 137b, and keyboard 139. The control circuit 144 outputs a tuning voltage "$V_T$" to the tuner 142 with reference to the intermediate frequency signal IF when the up key 137a down key 137b in the key input unit 147 are operated, and thus performs the tuning control for selecting the adjacent channel. Also, the response to the mode signal designated by the key input unit 147, the control circuit 144 furnishes a television ON/OFF signal "l", a sound ON/OFF signal "m", and a data bank ON/OFF signal "n" to a power supply circuit 148. This power supply circuit 148 is to supply drive voltages to the control circuit 144 and other circuits, and to determine whether or not the drive voltages to the respective circuit units are allowed to be applied in response to these ON/OFF signal "l", "m", and "n" derived from the control circuit 144.

Furthermore, the control circuit 144 converts the color signals R, G, B supplied from the television linear circuit 143 into 4-bit digital data D1 to D4, respectively by controlling the A/D converting circuit, and outputs these digital data to the shift register 149, and also produces various timing signals $\phi 1$, $\phi 2$, $\phi c$, $\phi F$, $\phi n$, and SR by internal circuits so as to be supplied to various circuits. The shift register 149 is separated into three color systems, sequentially shifts the digital data (D1 to D4) X3 in response to the clock pulses $\phi 1$ and $\phi 2$ output from the control circuit 144, and outputs the read data to the latch circuit 150. This latch circuit 150 latches the data derived from the shift register 149 in synchronism with the timing signal $\phi n$ and outputs the latched data to a driver 151. To this driver 151, a liquid crystal display driving voltage is applied from the power supply circuit 148, and the clock $\phi c$ and frame signal $\phi F$ for forming a graduation signal are input from the control circuit 144. In response to the data latched by the latch circuit 150, the driver circuit 151 produces the graduation signal in order to drive segment electrodes Y1 to Y408 of the color liquid crystal panel 135 under the R, G, B color display mode. In this case, the drive signals output from the driver 151 are inverted in synchronism with the frame signal $\phi F$. The color liquid crystal display panel 135 is constructed in a size of, for instance, 1.7 inches, and such that the signal electrodes are provided so that there are 136 dots per each color (i.e., 408 dots in total), whereas the scanning electrodes are provided so that there are 119 lines in total. The data display areas of the color liquid crystal display panel 135 are allocated in such a manner that, for instance, a character constructed of $16 \times 16$ (X3) dots is displayed in a character area defined by $17 \times 17$ (X3) dots with respect to the data display for the data bank. Therefore, 8 characters are displayed in the horizontal direction, whereas 7 characters are displayed in the vertical direction in the color liquid crystal panel 135.

From the control circuit 144, both shift data "SR" and shift clock "$\phi n$" are sent to a common side of the shift register 152 to sequentially shift the shift data "SR" in response to the shift clock $\phi n$ and to output the shifted data to the driver 153. Both the frame signal $\phi F$ derived from the control circuit 144 and the liquid crystal drive voltage applied from the power supply circuit 148 are supplied to the control circuit 144. The driver 153 sequentially selectively drives the scanning electrodes X1 to X111 of the color liquid crystal display panel 135 in accordance with the shifted data from the shift register 152.

Internal Circuit Of Control Circuit

Figure 14:
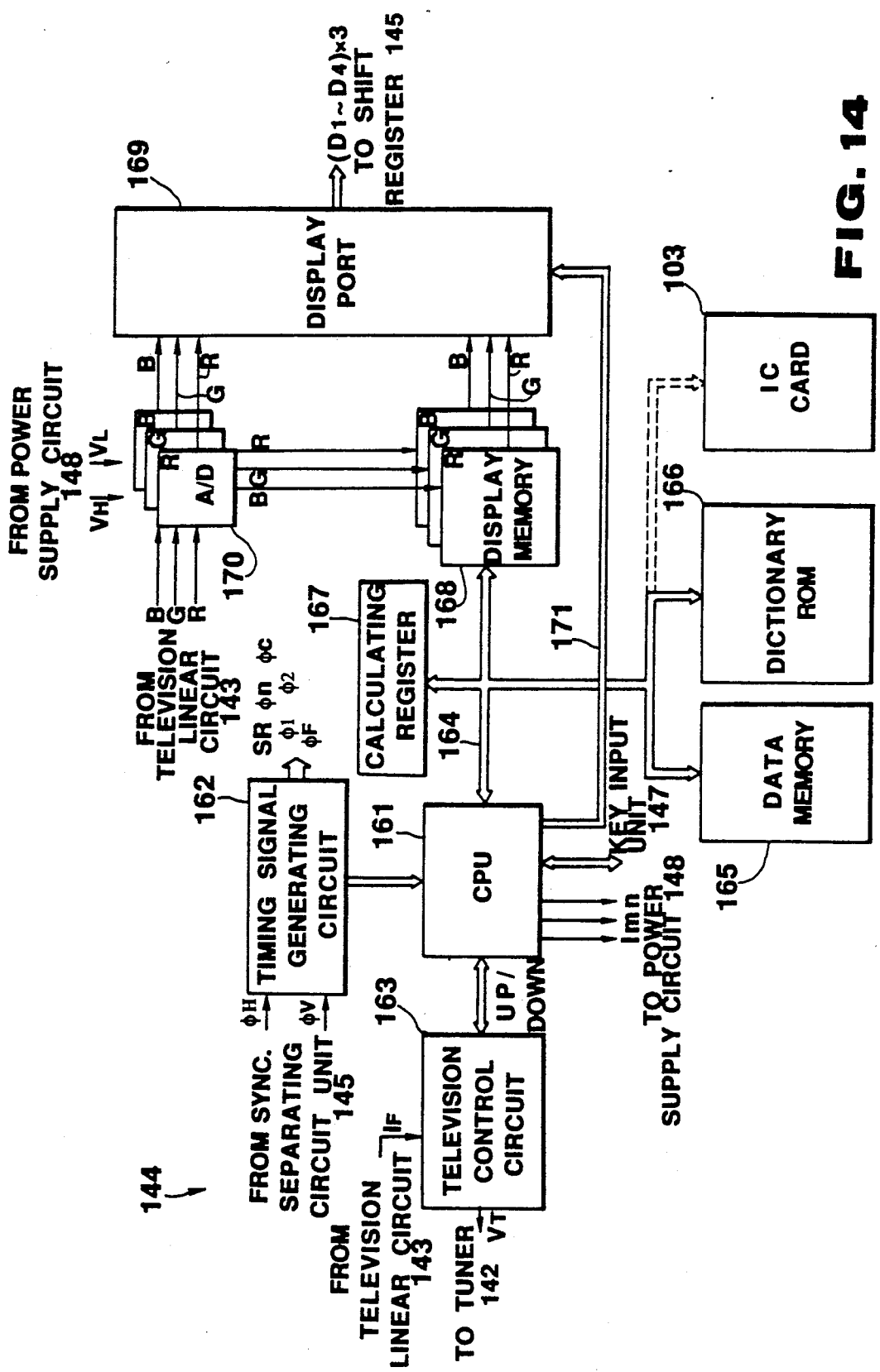
FIG. 14 is a schematic block diagram showing a detailed circuit arrangement of the control circuit shown in FIG. 13.

Referring now to FIG. 14, an internal circuit of the above-described control circuit 144 will be described.

In the internal circuit of the control circuit 144, a central process unit 161 is connected to the key input unit 147 and receives clock pulse from a timing signal generating circuit 162. In response to the horizontal sync signal $\phi H$ and vertical sync signal $\phi V$ supplied form the sync separating circuit 145, the timing signal generating circuit 162 generates the clock pulse and the above-described various timing signals SR, $\phi n$, $\phi c$, $\phi 1$, $\phi 2$, and $\phi F$.

CPU 161 produces the above-described ON/OFF signals "l", "m", and "n" in response to the operation mode set by the key input unit 147 so as to output these signals to the power supply circuit 148. CPU 161 furthermore outputs an up/down control command UP/-DOWN to a television control circuit 163 in response to the operations of the up key 137a and down key 137b. Upon receipt of the up/down control command UP/-DOWN, the television control circuit 163 produces the tuning voltage $V_T$ with reference to the intermediate frequency signal IF derived from the television linear circuit 143, and outputs this tuning voltage to the tuner 142 for tuning purposes.

To CPU 161, a data memory 165, dictionary ROM 166, calculation register 167, and display memory 168 are connected via a bus line 164, and also the IC card 103 inserted into the IC card insertion opening 140 is connected. The display memory 168 is so arranged that 1 TV frame display data are stored for the respective color picture information. The above-described CPU 161, data memory 165, dictionary ROM 166, calculation register 167, and display memory 168 constitute a data processing unit (i.e., data bank), in which the data stored in the display memory 168 are transferred to a display port 169. Also to this display port 169, the color signals R, G, B, sent from the television linear circuit 143 are input via an A/D converting circuit 170. This A/D converting circuit 170 converts the analog color signals R, G, B into 4-bit digital data D1 to D4 in response to the upper limit reference voltage $V_H$ and lower limit reference voltage $V_L$, and outputs the digital color data D1 to D4 to the display port 169. Furthermore, a display changing signal is supplied via a control bus 171 to this display port 169 in accordance with the selected operation mode from CPU 161. The display port 169 selects either the data stored in the display memory 168 or the converted data from A/D converting circuit 170 in response to the display changing signal from CPU 161 so as to output the selected signal to the shift register 149. The control circuit 144 continuously applies the power supply voltage to CPU 161 and data memory 165.

In case that the TV mode is selected in this electronic note book with the above-described circuit arrangement, the television power switch 136 is turned on and selects the VHF or UHF receiving mode.

The mode key provided on the keyboard 139 is operated when the TV mode is changed into the data bank mode, and also the data bank mode is switched into the TV mode. The IC card readout mode is instructed in the data bank mode in case that the various data read from the IC card 103 which has been inserted into the IC card insertion opening 140 is displayed on the color liquid crystal panel 135.

When the data bank mode is designated by way of the above-described mode key operation on the keyboard 139, CPU 161 changes the television ON/OFF signal "l" output to the power supply circuit 148 therefrom into a low level thereof and also the data bank ON/OFF signal "m" into a high level thereof, furthermore turns off the power source to the TV picture circuit and turns on the power source to the data bank. Thereafter, CPU 161 delivers the display change instruction to the display port 169 so as to change the display port 169 into the display memory 168. As a result, the data which has been stored in the display memory 168 is selected by the display port 169 and transferred to the shift register 149 shown in FIG. 13, and thus display of the color liquid crystal display panel 135 is changed into the data bank. Under this condition, when the data is input by the keyboard 136, the function of the data bank is initialized, and therefore, the input data, processed data and the like are displayed on the color liquid crystal display panel 135. It should be noted that in this data bank mode, it is possible to process various data such as register, retrieve, correction operations of telephone numbers, and data calculation.

Then, when the IC card readout mode is designated to enter either a desirable disk number or a track number during the data bank mode, CPU 161 retrieves data in the address supervising unit 120 of the IC card 103 so as to obtain the address of the index information corresponding to the entered disk number, or track number in the data memory unit 121. Then, CPU 161 reads the index information from the data memory unit 121 based upon the address obtained from the address supervising unit 120, and also writes this index information into the display memory 168.

A plurality of index information which have been stored into the display memory 168 are sequentially read by the display port 169 and transferred to the shift register 149 in order to be displayed on the color liquid crystal display panel 135. Under the condition, when the forward key of the keyboard 139 is operated, CPU 161 reads from the IC card 103 the index information which has been stored at the next address, and writes this index information into the display memory 168. As a consequence, the subsequent index information which has been just stored in the display memory 168 is displayed. Similarly, when the forward key is operated, other index information which have been stored in the IC card 103 are successively read to the display memory 168 and displayed on the color liquid crystal display panel 135. In this case, if the back key provided on the keyboard 139 is operated, the display content of the color liquid crystal display panel 135 can be moved in the reverse direction.

As previously described, various information stored in the IC card 103 can be displayed on the color liquid crystal display panel 135 of the electronic note book.

It is also possible that the index information is written into the IC card 103 by operating not only the photographing camera, but also the electronic note book.

In accordance with the above-described embodiment, the index information is key-input in the above-described IC card mode so that the disk number and track number may be searched.

In this case, CPU 161 retrieves data in the data memory unit 121 based upon the input index information so as to acquire the address of the desirable index information from the data memory unit 121 into which these index information have been stored. Subsequently, CPU 161 retrieves data in the address supervising unit 120 based upon the acquired address during the above-described retrieve process, and writes the relevant disk number and track number into the display memory 168 so as to perform the display process similar to the above-described process.

Then, when the above-described data bank mode is changed into the TV mode, the TV mode is designated by operating the mode key on the keyboard 139. Once the TV mode key is designated, CPU 161 changes the television ON/OFF signal "(" supplied to the power supply circuit 148 into a high level thereof so as to turn off the power supply to the data bank. In addition, this CPU 161 sends the display change signal to the display port 169 in order to change the display port 169 into the A/D converting circuit 170. As a result, the television mode is set where the TV picture data is selected by the display port 169 and then displayed on the color liquid crystal panel 135.

Arrangement Of Video Camera

Referring now to FIGS. 15 to 18, another preferred embodiment of the invention where a video camera is provided will be described.

Figure 15:
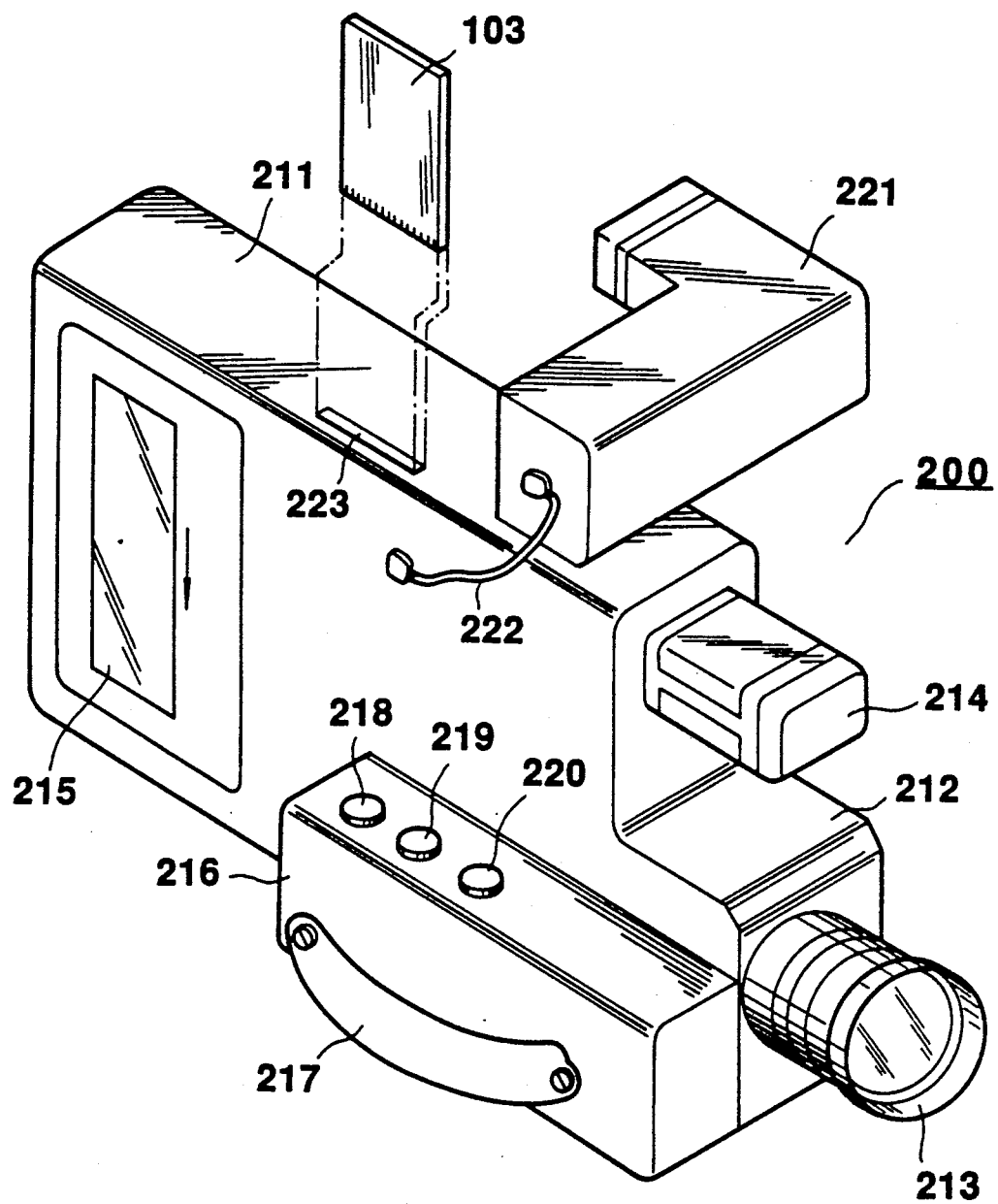
FIG. 15 is a perspective view of an electronic video camera for an electronic video camera system according to a third preferred embodiment of the invention.

FIG. 15 is a perspective view of a video camera 200 to which the present invention has been applied. In FIG. 15, reference numeral 211 is a video camera body case. A front end of the video camera body case is formed in a stepped portion, a cylindrical zoom lens 213 is mounted on the tip of this stepped portion 212, and microphone 214 is positioned at an upper portion of this stepped portion 212. A video tape mounting unit 215 is provided at a left side of the body case 211, as viewed in the drawing, and also a hand clip 216 is formed thereon. A gripping belt 217 is provided on the side surface of this hand grip 216, and a REC/stop key 218, zoom-in key 219, and zoom-out key 220 are arranged on an upper surface of the hand grip 216. That is, the video camera 200 acording to the preferred embodiment is so designed that while a photographer inserts his hand into the gripping belt 217 so as to hold the video camera 200 by utilizing the hand grip 216, the above-described REC/stop key 218, zoom-in key 219 and zoom-out key 220 can be freely operated by his finger. A further view finder 221 is mounted on the upper surface of the body case 211. This view finder 221 is L-shaped, one end of which is positioned to project from the side of the body case 211, so that a photographer can easily view an object to be imaged through this view finder 221 from the side direction of the body case 211. The view finder 221 is connected via a connection cord 222 to an electronic circuit provided within the body case 211. The IC card insertion opening 223 is formed on the upper surface of the body case 211. When the IC card 103 is inserted into this IC card insertion opening 223, the inserted IC card 103 is electrically connected to the electronic circuit.

Figure 16:
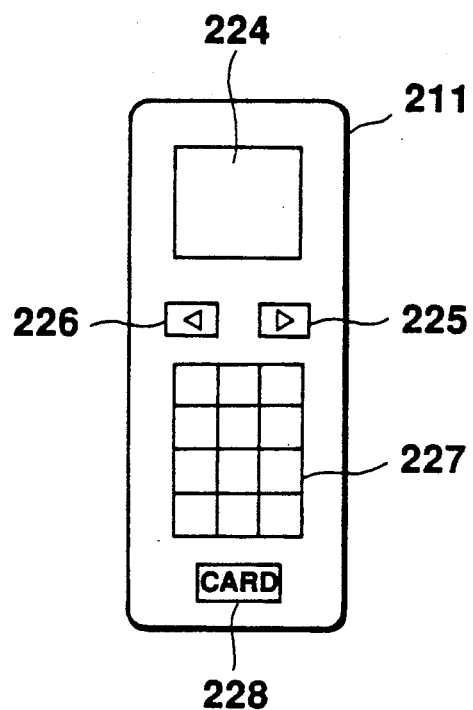
FIG. 16 is a perspective view for representing a portion of a rear unit of the electronic video camera shown in FIG. 15.

Also, on the back surface of the body case 211, there are provided a liquid crystal display apparatus 224 for monitor purposes as represented in FIG. 16; a forward key 255 and a back key 226 for forwarding/backwarding the designation address of the IC card 103, a key input unit 227 for entering the index information; and a register key 220 for instructing the IC card 103 to register the data.

Video Camera Circuit

Figure 17:
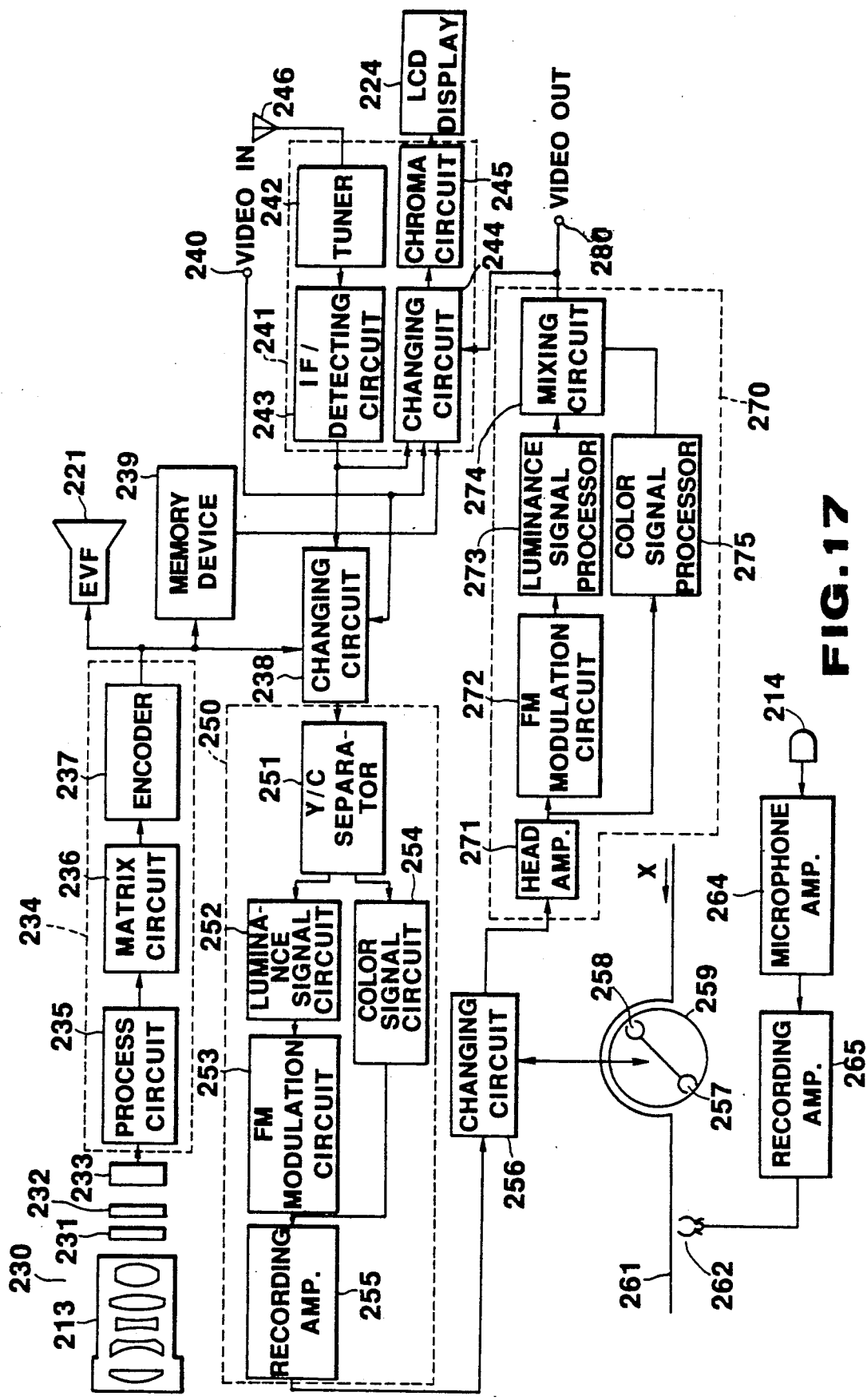
FIG. 17 is a schematic block diagram representing an internal arrangement of the electronic video camera shown in FIG. 15.

FIG. 17 is a block diagram of an entire circuit of the video camera 200. In the circuit shown in FIG. 17, is arranged an optical system 230 which includes a zoom lens 213, an optical type low pass filter 231, an infrared cutout filter 232, and an imaging element 233 such as a change-coupled device (CCD). Focusing and exposure operations are automatically adjusted by way of an auto-focusing mechanism and EE mechanism. The imaging element 233 is sequentially scanned by a video camera system circuit 234 in order that a video signal is substantially equal to a normal television signal. The video camera system circuit 234 comprises a process circuit 235, a matrix circuit 236, and an encoder 237. The video signal output from this encoder 237 is input into the view finder 221 and a signal changing circuit 238, and is also input into a memory device 239 (will be discussed in detail).

Both a video signal supplied to an external terminal 240 and another video signal output from a television system circuit 241 are input into this signal changing circuit 238. The television system circuit 241 comprises a tuner 242, an IF (intermediate frequency)/detecting circuit 243, a changing circuit 244, and a chrominance circuit 245. An antenna 246 is connected to this TV system circuit 241 and the above-described liquid crystal display device 224 is connected to the chrominance circuit 245. The tuner 242 selects the electromagnetic wave of the designated channel among the TV electromagnetic waves received by the antenna 246, converts this TV signal into an intermediate frequency signal, and outputs the IF signal to the IF/detecting circuit 243. The IF/detecting circuit 243 amplifies and detects the intermediate frequency signal so as to derive the video signal which will be then supplied to the changing circuits 236 and 244. The changing circuit 244 makes a selection on the video signal derived from the IF/detecting circuit 243, another video signal supplied from the external terminal 240, and also another video signal obtained from a VTR reproducing system circuit 270 (will be discussed later) in response to an instruction given from a control unit (not shown in detail), and than outputs the selected video signal to the chrominance circuit 245. The function of this chrominance circuit 245 is to chrominance-process the video signal selected from the changing circuit 244 and to output the processed video signal to the liquid crystal display apparatus 224 for display purposes.

Furthermore, the changing circuit 238 selects the video signal derived from the encoder 237, the video signal furnished from the external terminal 240, or the video signal supplied from the IF/detecting circuit 243 in response to an instruction supplied from the control unit, and thus inputs the selected video signal to a VTR recording system circuit 250. This VTR recording system circuit 250 comprises a Y/C (luminance signal/chrominance signal) separating circuit 251, a luminance signal processing circuit 252, an FM modulation circuit 253, a color signal processing circuit 254, and a recording amplifier 255. The Y/C separating circuit 251 separates the input video signal into the luminance signal and chroma (chrominance) signal. The luminance signal which has been separated from the Y/C separating circuit 251 is input via the luminance signal processing circuit 252 to the FM modulation circuit 253, and further FM-modulated. Then, the FM luminance signal is input into the recording amplifier 255. The chrominance signal which has been separated by the Y/C separating circuit 251, is processed in the color signal 254 to be converted into R, G, B color signals, which will be then input into the recording amplifier 255. This recording amplifier 255 amplifies both the FM modulated signal derived from the FM modulation circuit 253 and also the color signal derived from the color signal processing circuit 254, and outputs the amplified signals to the changing circuit 256.

Video heads 257 and 258 are connected to the changing circuit 256. These video heads 257 and 258 are mounted in such a way that the video heads are separated by 180° around a rotary drum 259, and are rotationally driven at a constant speed. Around this rotary drum 259, a video tape 261 is wound within a predetermined angle range, and also run in a direction indicated by an arrow "X" at a constant speed. Furthermore, an audio head 262 is positioned adjacent the rotary drum 259 in such a manner to contact the video tape 261. An audio signal input into a microphone 214 is amplified in a microphone amplifier 264 and also in a recording amplifier 265, and is then supplied to the audio head 262. It should be noted that for the sake of simplicity, a sound signal reproducing circuit system is omitted.

In case that the recording mode is designated, the changing circuit 256 outputs the signal supplied from the VTR recording system circuit 250 to the video heads 257, 258, whereas when the reproducing mode is designated, the output reproduced from the video heads 257, 258 is output to a VTR reproducing system circuit 270 by the changing circuit 256.

The VTR reproducing system circuit 270 comprises a head amplifier 271, an FM demodulation circuit 272, a luminance signal processing circuit 273, a mixture circuit 274, and a color signal processing circuit 275. The reproduction signal input into the VTR reproducing system circuit 270 is amplified by the head amplifier 271 and thereafter input into the FM demodulation circuit 272 and color signal processing circuit 275. The FM demodulation circuit 272 demodulates the signal which has been FM-modulated with respect to the output signal from the head amplifier 271, and outputs the demodulated signal via the luminance signal processing circuit 273 to the mixture circuit 274. The color signal output from the head amplifier 271 is processed to obtain a chroma signal, which will be supplied to the mixture circuit 274. The mixture circuit 274 mixes the luminance signal output from the luminance signal processing circuit 173 with the chroma signal output from the color signal processing circuit 275 to obtain a video signal. Then, this video signal is output to the changing circuit 244 of the TV system circuit 241 and is also output to an external device (not shown) via the external terminal 280.

Internal Circuit Of Memory Device

Figure 18:
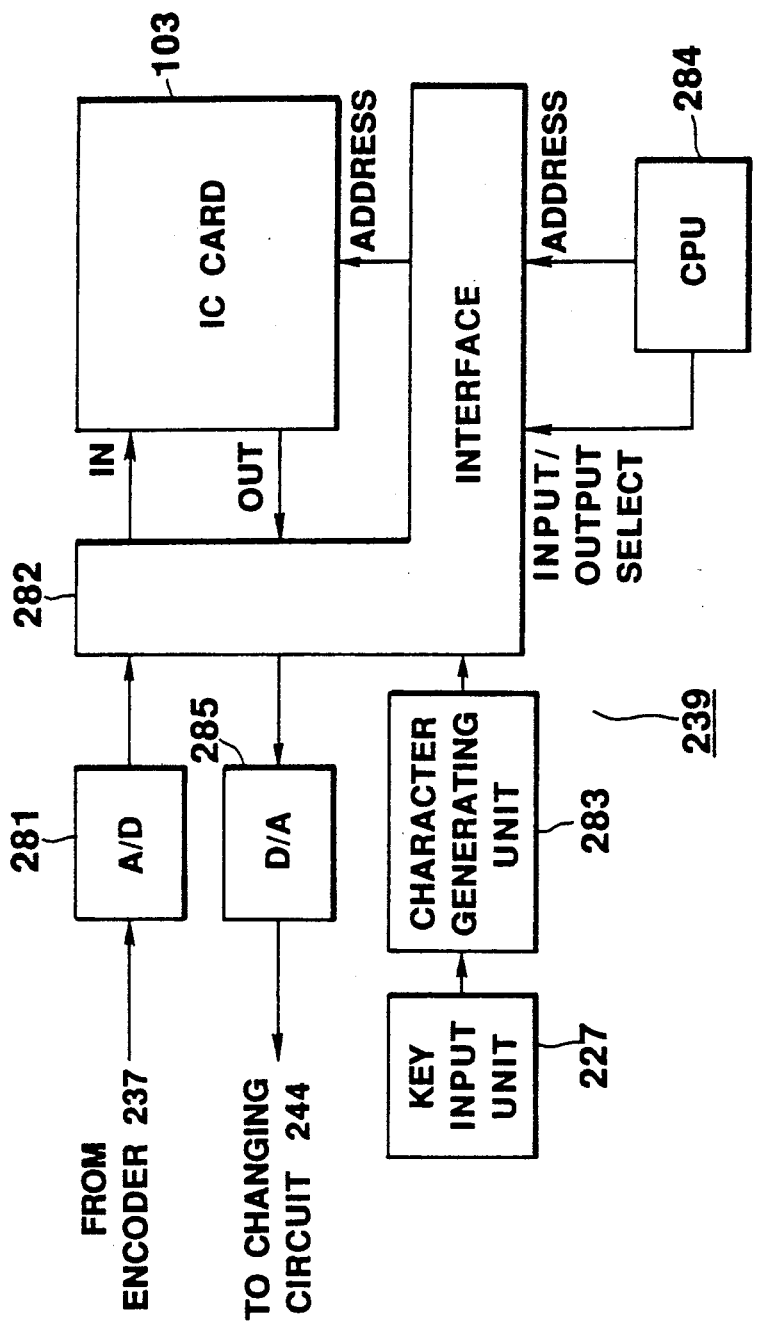
FIG. 18 is a schematic block diagram representing a detailed circuit arrangement of the recording apparatus shown in FIG. 17.

In FIG. 18, there is shown an internal circuit of the above-described memory device 239. The video signal supplied from the video camera system circuit 234 shown in FIG. 17 is converted into digital video data in an A/D converting circuit 281 and thereafter, the A/D converted video data is input into an interface 282. The key input signal supplied from the key input unit 227 shown in FIG. 16 is converted into character data by a character generating unit 283, and then, the character data is supplied to an interface 282. To this interface unit 283, CPU 284 and a D/A converting circuit 285 are connected, and also the IC card 103 inserted into the IC card insertion opening 223 is connected. CPU 284 outputs both an input/output select signal corresponding to the setting mode and address data of the IC card 103 to the interface 282. In response to the select signal and address data supplied from CPU 284, the interface 282 selects the data derived from the A/D converting circuit 281 or character generating unit 283 so as to write this data at the designated address of the IC card 103, and reads the data stored in the IC card 103 in order to output this read data into the D/A converting circuit 285. The D/A converting circuit 285 converts the digital data read from the IC card 103 into the corresponding analog signals, which will be output to the TV system circuit 141 shown in FIG. 17.

Operations Of Video Camera

When the photographing operation is performed by utilizing the above-described video camera 200, the index information is input from the key input unit 227 so as to be stored in the IC card 103. As this index information, for instance, "a tape number", "a photographed place", "a date and time" and the like are stored for each photographed tape. To input such an index information, the index information write mode is designaed from the key input unit 227 and then the register key 228 is operated. When the index information write mode is designated, CPU 284 transfers the select signal so as to select the output of the character generating unit 283. As a result, the interface 282 temporarily stores the character data derived from the character generating unit 283 after the index information is input from the key input unit 227, and stores this character data into the IC card 103 in accordance with the address data from the CPU when the register key 228 is operated.

It is also possible to store a part of photographed pictures into the IC card 103 as the above-described index information. In this case, the index picture write mode is designated by the key input unit 227. Upon designation of this index picture mode, CPU 284 sends the select signal to the interface 282 in order to select the output derived from the A/D converting circuit 281. When the photographing operation is carried out under this condition, the video signal output from the video camera system circuit 234 is input into the memory device 239, and converted into the digital data by the A/D converting circuit 281, which will be then input into the interface 282. Then, under this photographing condition, when the register key 228 is operated, the video data supplied from the A/D converting circuit 281 is stored into the IC card 103 based upon the address instruction made by CPU 284 under the control of the interface 282.

In case that the index information which has been stored into the IC card 103, as previously described, is confirmed, the IC card read mode is designated by the key input unit 227. When this read mode is designated, CPU 284 supplies either the head address or the address corresponding to the tape number which is key-input, of the data memory unit 121 in the IC card 103 to the interface 282, and also instructs that this stored information is read and output to the A/D converting circuit 285. As a result, either the head address of the data memory unit 121 in the IC card 103, or the index information stored at the address corresponding to the input tape number is read via the interface 282 to the D/A converting circuit 285, and thereafter converted into the analog signal, which will be then transferred to the TV system circuit 241 shown in FIG. 17. In case that the above-described IC card read mode is designated, the TV system circuit 241 outputs the index information which has been transferred from the D/A converting circuit 285 and selected by the changing circuit 238, to the chroma circuit 245 in order to convert this signal into the three color signals R, G, B, which will be displayed on the liquid crystal display device 224. It should be noted that the index information which has been stored in the IC card 103 can be arbitrarily read by changing the designated address by operating the forward key 225 and back key 226 provided on the key input unit 227. As a consequence, the photographed contents in the respective tapes can be readily confirmed based upon the index information which has been stored in the IC card 103.

Furthermore, the index information which has been stored in the IC card 103 can be similarly confirmed by the electronic note book, as shown in FIGS. 12A and 12B, which is similar to the above-described second preferred embodiment.

What is claimed is:

1. An image data processing apparatus comprising:
   a first housing;
   data input means provided in said first housing, for inputting information data and identification data;
   memory means provided in said first housing, for storing said information data and identification data input from said data input means;
   data processing means provided in said first housing, for processing said information data based on said identification data;
   a recording medium;
   a second housing detachably connected to said first housing and including means for detachably storing said recording medium;
   image signal producing means provided in said second housing, for producing an electrical image signal from an optical image of an object;
   first recording means provided in said second housing, for recording said electrical image signal produced by said image signal producing means on said recording medium;
   second recording means provided in said second housing, for recording said identification data input from said data input means on said recording medium, so as to identify said recording medium;
   a third housing detachably connected to said first housing and including means for detachably storing said recording medium;
   firs reproducing means provided in said third housing, for reproducing the electrical image signal recorded on said recording medium;
   second reproducing means provided in said third housing, for reproducing said identification data recorded on said recording medium; and
   first output means for outputting said identification data reproduced by said second reproducing means to said data processing means provided in said first housing.

2. The image data processing apparatus of claim 1, wherein said data processing means includes searching means for searching said information data stored in said memory means, based on said identification data output from said first output means.

3. The image data processing apparatus of claim 2, further comprising:
   second output means provided in said first housing, for outputting said information data searched by said searching means from said memory means; and
   superimposing means provided in said third housing, for superimposing said information data output from said memory means by said second output means on said image signal reproduced by said first reproducing means.

4. The image data processing apparatus of claim 1, further comprising:
   display means provided in said first housing, for displaying data; and
   designating means provided in said first housing, for designating a search operation for said data processing means; and
   wherein said data processing means includes searching means for searching said information data stored in said memory means based on said identification data input from said data input means, when said designating means designates a search operation, and for outputting said searched information data from said memory means to said display means.

5. The image data processing apparatus of claim 4, wherein said searching means includes means for searching said identification data stored in said memory means based on said information data input from said data input means, when said designating means designates the search operation, and for outputting said searched information data from said memory means to said display means.

6. The image data processing apparatus of claim 1, further comprising;
  release signal generating means provided in said second housing, for generating a release signal;
  and wherein:
  said image signal producing means includes means for producing an electrical still-image signal from the optical image of the object to be imaged in response to said release signal generated by said release signal generating means;
  said first recording means includes means for recording a plurality of said electrical still-image signals produced by said image signal producing means on said recording means;
  said data input means includes means for inputting index data to identify said electrical still-image signal recorded on said recording medium;
  said memory means includes means for storing said index data input from said data input means;
  said data processing means includes means for processing said information data based on said index data; and
  said first reproducing means includes means for reproducing said electrical still-image signal recorded on said recording medium.

7. The image data processing apparatus of claim 6, wherein said data processing means includes searching means for searching said information data stored in said memory means based on said index data identifying said electrical still-image signal reproduced by said first reproducing means.

8. The image data processing apparatus of claim 7, further comprising:
  second output mean provided in said first housing for outputting said information data searched by said searching means from said memory means; and
  superimposing means provided in said third housing, for superimposing said information data searched by said searching means on said electrical still-image signal reproduced by said first reproducing means.

9. The image data processing apparatus of claim 1, wherein:
  said recording medium includes a plurality of recording areas capable of storing said electrical image signal;
  said first recording means includes means for recording said electrical image signal in one of said recording areas;
  said data input means includes means for inputting index data to identify said recording areas;
  said memory means includes means for storing said index data input from said data input means; and
  said data processing means includes means for processing said information data based on said index data.

10. The image data processing apparatus of claim 9, wherein said data processing means includes searching means for searching said information data stored in said memory means, based on said index data identifying said recording area in which said electrical image signal reproduced by said first reproducing means is recorded.

11. The image data processing apparatus of claim 10, further comprising:
  second output means provided in said first housing, for outputting said information data searched by said searching means from said memory means; and
  superimposing means provided in said third housing, for superimposing said information data output from said memory means by said second output means on said image signal reproduced by said first reproducing means.

12. An image data processing apparatus comprising:
  a first housing;
  a recording medium detachably stored in said first housing;
  image signal producing means provided in said first housing, for producing an electrical image signal from an optical image of an object;
  recording means provided in said first housing, for recording said electrical image signal produced by said image signal producing means on said recording medium;
  reproducing means provided in said first housing, for reproducing said electrical image signal recorded on said recording medium by said recording means;
  first data input means provided in said first housing, for inputting information data and identification data to identify said recording medium;
  memory means detachably connected to said first housing, for storing said information data and said identification data input from said first data input means;
  a second housing detachably connected to said memory means;
  second data input means provided in said second housing, for inputting identification data;
  searching means provided in said second housing, for searching said information data stored in said memory means, based on said identification data input from said second data input means, and for outputting said searched information data from said memory means; and
  display means provided in said second housing, for displaying said information data output from said memory means by said searching means.

13. The image data processing apparatus of claim 12, wherein:
  said first data input means includes image data input means for inputting image data corresponding to said electrical image signal produced by said image signal producing means;
  said memory means includes means for storing said image data input from said image data input means;
  said searching means includes means for searching said image data stored in said memory means based on said identification data input from said second data input means and for outputting said searched image data from said memory means; and
  said display means includes means for displaying said image data output from said memory means by said searching means.

14. The image data processing apparatus of claim 12, wherein:
  said first data input means includes image data input means for inputting still-image data corresponding to said electrical image signal produced by said image signal producing means;

said memory means includes means for storing said still-image data input from said image data input means;

said searching means includes means for searching said still-image data stored in said memory means based on said identification data input from said second data input means and four outputting said searched still-image data from said memory means; and said display means includes means for displaying said still-image data output from said memory means by said searching means.

15. The image data processing apparatus of claim 14, wherein said image data input means includes analog-to-digital converting means for converting said electrical image signal produced by said image signal producing means into a corresponding digital image data signal.

* * * * *

UNITED STATES PATENT AND TRADEMARK OFFICE
CERTIFICATE OF CORRECTION

PATENT NO. : 5,130,813
DATED : July 14, 1992
INVENTOR(S) : OIE et al

It is certified that error appears in the above-identified patent and that said Letters Patent is hereby corrected as shown below:

Column 26, line 29 (claim 1), replace "firs" with --first--.

Column 29, line 7 (claim 14), replace "four" with --for--.

Signed and Sealed this

Nineteenth Day of October, 1993

Attest:

BRUCE LEHMAN

Attesting Officer

Commissioner of Patents and Trademarks